US011085209B2

(12) United States Patent
Llewellyn et al.

(10) Patent No.: US 11,085,209 B2
(45) Date of Patent: Aug. 10, 2021

(54) SURFACE-MOUNTABLE LOCKING DEVICE

(71) Applicant: Bluewater Resources LLC, Cotulla, TX (US)

(72) Inventors: Jake Llewellyn, Cotulla, TX (US); Neal Llewellyn, Cotulla, TX (US); John Llewellyn, Fort Worth, TX (US); Alexander Villareal, San Antonio, TX (US)

(73) Assignee: Bluewater Resources LLC, Cotulla, TX (US)

( * ) Notice: Subject to any disclaimer, the term of this patent is extended or adjusted under 35 U.S.C. 154(b) by 0 days.

(21) Appl. No.: 16/773,917

(22) Filed: Jan. 27, 2020

(65) Prior Publication Data
US 2020/0157853 A1 May 21, 2020

Related U.S. Application Data

(63) Continuation of application No. 16/001,665, filed on Jun. 6, 2018, now Pat. No. 10,550,609, which is a (Continued)

(51) Int. Cl.
*E05B 73/00* (2006.01)
*B63B 25/28* (2006.01)
(Continued)

(52) U.S. Cl.
CPC .............. *E05B 73/00* (2013.01); *B60P 7/10* (2013.01); *B63B 25/28* (2013.01); *B60P 7/0815* (2013.01);
(Continued)

(58) Field of Classification Search
CPC .. B60P 7/08; B60P 7/0807; B60P 7/13; B60P 7/0815; B60P 7/0892; B60P 7/10;
(Continued)

(56) References Cited

U.S. PATENT DOCUMENTS 2,016,861 A 7/1936 Lowe
3,130,689 A 4/1964 Johnston
(Continued)

FOREIGN PATENT DOCUMENTS

GB 2277122 8/1995

OTHER PUBLICATIONS

United States Patent and Trademark Office, Non-Final Office Action in U.S. Appl. No. 15/284,339, dated Oct. 5, 2017, USA.
(Continued)

*Primary Examiner* — D Glenn Dayoan
*Assistant Examiner* — Sunsurraye Westbrook
(74) *Attorney, Agent, or Firm* — D. Tiller Law PLLC; Donald Tiller

(57) ABSTRACT

A surface-mountable locking system is designed to secure an item to a surface via one or more mechanical engagements that are protected from tampering by encompassing the engagements point(s) within cavity-defining surfaces. In one example the mechanical engagement is effected by placing a pin in a box and securing the pin in the box using a bolt and the tampering protection is effected by the surfaces that define the box. In another example, the mechanical engagement is effected by placing a surface-attached anchor within a cavity and securing the anchor relative to the cavity using a bolt and the tampering protection is effected by the surfaces that define the cavity. The securing bolt may be, for example, the bolt of locking mechanism, a threaded bolt to engage a receptacle having complementary threads, or a smooth bolt to engage a receptacle having a shape complementary to that of the bolt.

13 Claims, 25 Drawing Sheets

Related U.S. Application Data continuation-in-part of application No. 15/471,168, filed on Mar. 28, 2017, now Pat. No. 10,384,589, which is a continuation-in-part of application No. 15/284,339, filed on Oct. 3, 2016, now Pat. No. 9,919,642.

(60) Provisional application No. 62/369,543, filed on Aug. 1, 2016.

(51) Int. Cl.
| | | |
|---|---|---|
| *B60P 7/10* | (2006.01) | |
| *B63B 25/24* | (2006.01) | |
| *B60P 7/08* | (2006.01) | |
| *E05C 1/06* | (2006.01) | |

(52) U.S. Cl.
CPC ............ *B60P 7/0892* (2013.01); *B63B 25/24* (2013.01); *B63B 2025/285* (2013.01); *E05B 73/0005* (2013.01); *E05C 1/06* (2013.01)

(58) Field of Classification Search
CPC ...... B60P 7/15; B60P 7/18; B60P 3/36; E05B 67/36; E05B 67/063; E05B 67/24; E05B 77/34; E05B 13/105; E05B 27/083; E05B 67/365; E05B 1/0038; B63B 2025/285; B63B 25/00; B63B 25/002; B63B 25/004; B63B 25/28
USPC .... 410/120, 77, 108, 34, 38, 69, 80, 90, 94, 410/78, 83, 97, 91; 224/403, 324, 404, 224/405, 315, 401, 543, 542
See application file for complete search history.

(56) References Cited

U.S. PATENT DOCUMENTS

| | | |
|---|---|---|
| 3,351,356 A * | 11/1967 | Clark ................... B60P 7/0807 410/110 |
| 3,429,151 A | 2/1969 | Weingart |
| 3,711,894 A | 1/1973 | Walters |
| 4,047,749 A | 9/1977 | Whaley et al. |
| 4,212,251 A | 7/1980 | DiMartino |
| 4,502,619 A | 3/1985 | Cox |
| 4,531,774 A | 7/1985 | Whatley |
| 4,772,165 A | 9/1988 | Bartkus |
| 5,186,588 A | 2/1993 | Sutton et al. |
| 5,447,049 A | 9/1995 | Shieh |
| 5,472,167 A | 12/1995 | Shillington et al. |
| 5,644,445 A | 9/1997 | Chang |
| 5,676,258 A | 10/1997 | Leyden et al. |
| 5,927,916 A | 7/1999 | Kroll et al. |
| 5,992,187 A | 11/1999 | Derman |
| 6,053,692 A | 4/2000 | Mason et al. |
| 6,098,434 A | 8/2000 | Liou |
| 6,135,686 A | 10/2000 | Chasen |
| 6,477,870 B1 | 11/2002 | Derman |
| 6,523,378 B2 | 2/2003 | Kuo |
| 6,539,758 B2 | 4/2003 | Meekma et al. |
| 6,543,260 B2 | 4/2003 | Koy et al. |
| 6,575,679 B2 | 6/2003 | Bourgault et al. |
| 6,588,720 B1 | 7/2003 | Revette |
| 6,626,480 B2 | 9/2003 | Anderson |
| 6,736,585 B2 | 5/2004 | O'Daniel |
| 6,782,725 B2 | 8/2004 | Linares |
| 6,793,081 B1 | 9/2004 | Derman |
| 7,001,122 B2 | 2/2006 | Bommarito et al. |
| 7,171,833 B1 | 2/2007 | Wu |
| 7,353,671 B2 | 4/2008 | Recknagel et al. |
| 7,448,236 B2 | 11/2008 | Recknagel et al. |
| 7,473,062 B2 * | 1/2009 | Laflamme ............ B60P 7/0892 410/108 |
| 7,832,568 B2 * | 11/2010 | Wu ........................ A47B 81/04 211/85.29 |
| 8,777,531 B2 | 7/2014 | Massicotte et al. |
| D817,147 S * | 5/2018 | Llewellyn ..................... D8/330 |
| 2002/0108407 A1 | 8/2002 | Zapushek |
| 2010/0072215 A1 | 3/2010 | Coon |
| 2011/0217139 A1 | 9/2011 | Walker |
| 2011/0221222 A1 | 9/2011 | Ross |
| 2012/0080467 A1 | 4/2012 | Irwin et al. |
| 2013/0026171 A1 | 1/2013 | James, Jr. |
| 2014/0223952 A1 | 8/2014 | Smith et al. |
| 2014/0319306 A1 | 10/2014 | Massicotte et al. |
| 2015/0360599 A1 | 12/2015 | Bean |

OTHER PUBLICATIONS

United States Patent and Trademark Office, Non-Final Office Action in U.S. Appl. No. 15/471,168, dated Dec. 31, 2018, USA.
United States Patent and Trademark Office, Non-Final Office Action in U.S. Appl. No. 15/823,324, dated Jun. 13, 2019, USA.
United States Patent and Trademark Office, Non-Final Office Action in U.S. Appl. No. 16/001,665, dated Apr. 5, 2019, USA.

* cited by examiner

A – A'

B – B'

D – D'

E – E'

F – F'

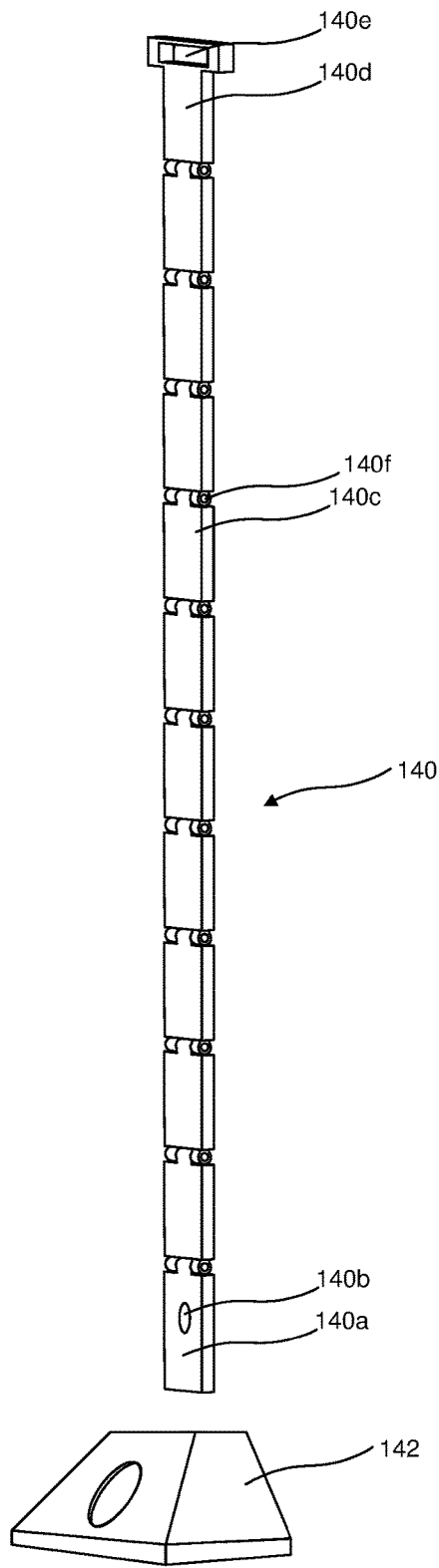
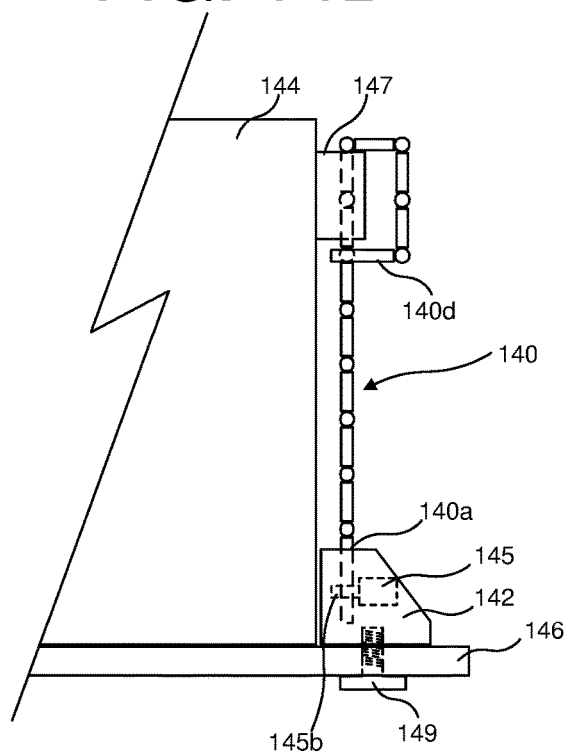

FIG. 15A
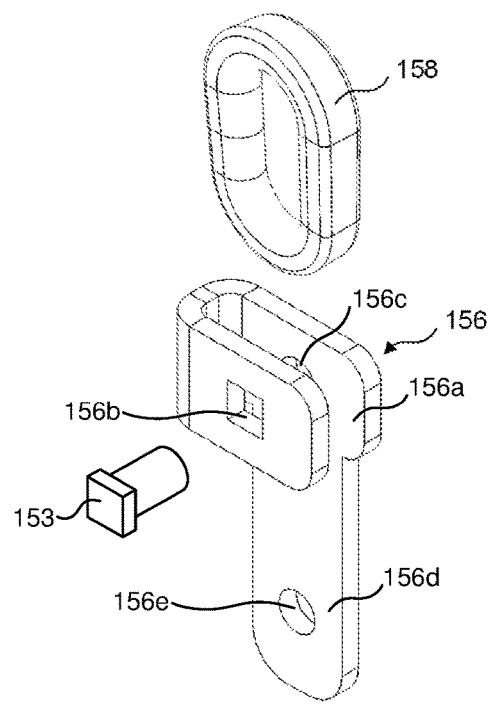
FIG. 15B
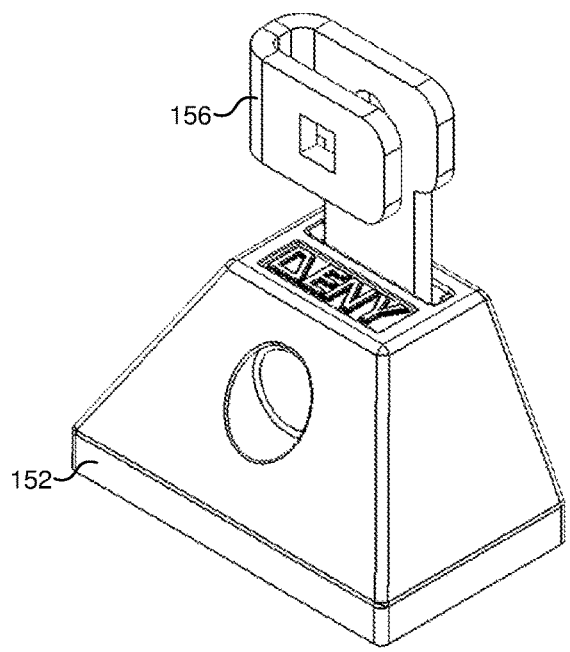
FIG. 15C
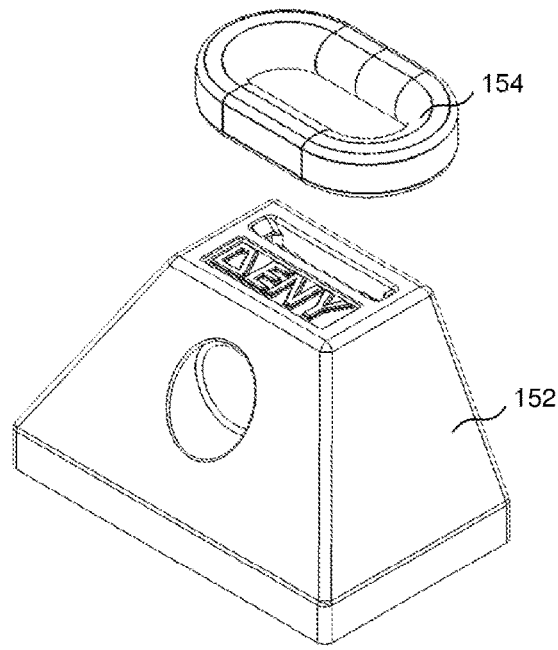
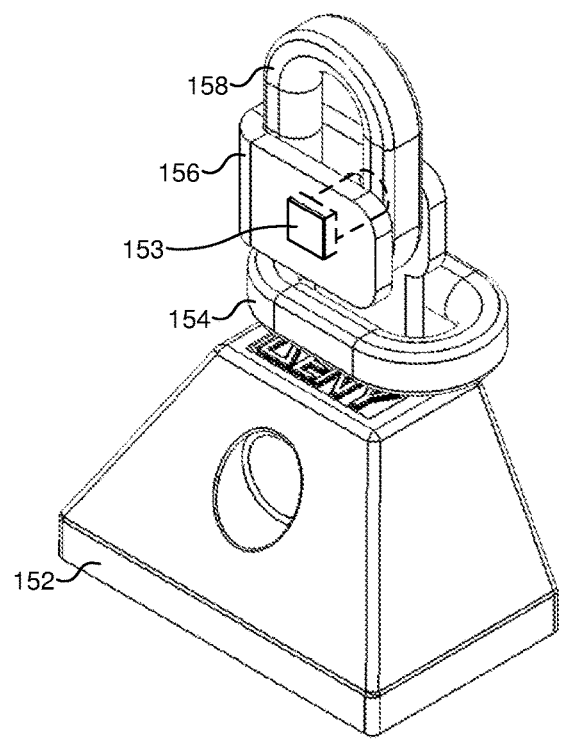

FIG. 22A
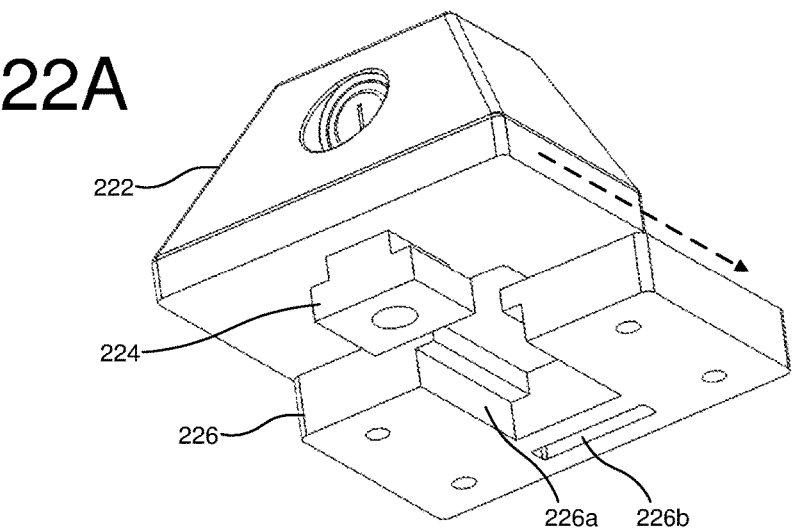
FIG. 22B
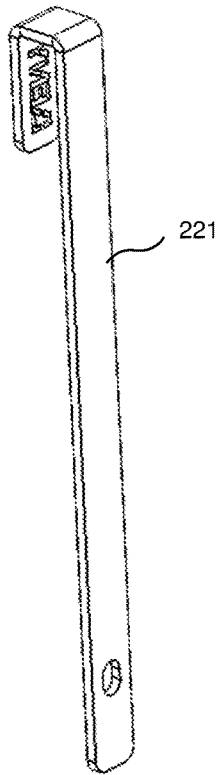
FIG. 22C
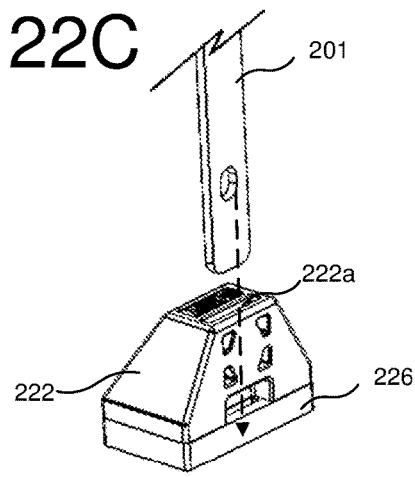
FIG. 22D
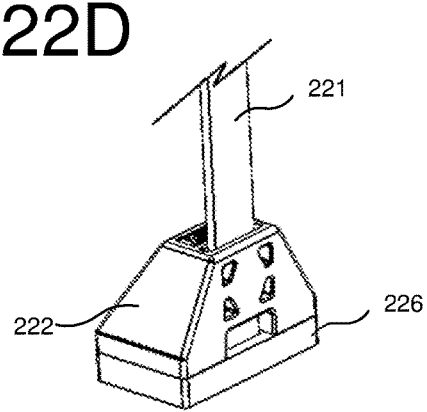
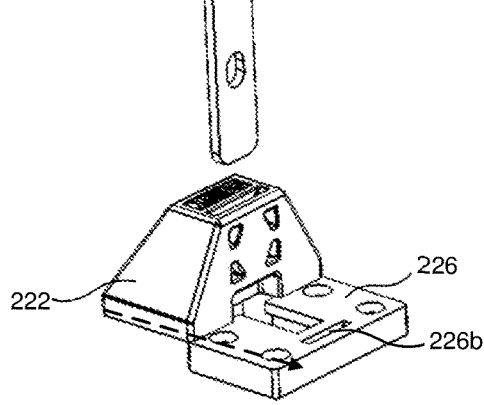

SURFACE-MOUNTABLE LOCKING DEVICE

CROSS-REFERENCE TO RELATED APPLICATIONS

This application is a continuation of U.S. patent application Ser. No. 16/001,665 filed on Jun. 6, 2019. U.S. patent application Ser. No. 16/001,665 is a continuation-in-part of U.S. patent application Ser. No. 15/471,168 filed on Mar. 28, 2017 (now U.S. Pat. No. 10,384,589). U.S. patent application Ser. No. 15/471,168 claims the benefit of U.S. Provisional Application No. 62/369,543 filed on Aug. 1, 2016 and is a continuation-in-part of U.S. patent application Ser. No. 15/284,339 filed on Oct. 3, 2016 (now U.S. Pat. No. 9,919,642) which claims the benefit of U.S. Provisional Application No. 62/369,543 filed on Aug. 1, 2016. These referenced applications are incorporated herein by reference.

BACKGROUND

This invention generally pertains to systems and methods for locking containers and other items to a surface. For example, the invention may be embodied as a device that can be readily installed on a transport surface, such as the bed of a pickup truck, and that locks the item in place to prevent or deter theft of the item. In another example, the invention may be embodied as a device that can be readily installed to or on a driveway or other paved surface and that can be used to lock the item to prevent or deter theft of the item.

One of the main failings of the prior art approach of locking an item to a surface is that the locking mechanism that engages the item (or strap connected to the item) is exposed to tampering. For example, the bolt on a padlock used to lock an item to an anchor on a surface is subject to tampering with a bolt cutter. And in such an approach the anchor itself is exposed to tampering with a bolt cutter or pry bar.

Accordingly, there is a need for a surface-mountable locking device that protects the locking mechanism and the mounting hardware from bolt cutters and pry bars and similar tampering tools.

SUMMARY

The present invention is directed to systems and methods that satisfy the need for a device to lock a container or other item to a surface.

In one aspect of the invention, a surface-mountable locking device has a body that includes: (1) a box configured to receive a pin and (2) a locking mechanism with a bolt configured to engage the received pin. In use, the bolt engages the pin within the body of the locking device and the bolt is thereby protected by the body at the point the bolt engages the pin. This serves to protect the bolt from tampering with, for example, bolt cutters. The locking device may be mounted to a surface by, for example, bolting the body to the surface. Similarly, the device may be mounted to a surface through a mounting plate attached to the surface (or that is integrally formed with the surface) through a sliding joint such as a T-nut/T-slot joint.

In another aspect of the invention, a surface-mountable locking device has a body with a cavity configured to fit over an anchor mounted on a surface (such as a ring or cleat in the bed or stake holes of a pickup truck). The locking device includes a member configured to engage the anchor (e.g., to hook through the anchor loop) and to be locked in place with respect to the locking-device body. The member may be locked in place by engagement with a bolt disposed within the body of the locking device. The bolt may be, for example, the bolt of a locking mechanism disposed within the body of the locking device or a threaded bolt configured to engage both the body of the locking device and the anchor-engaging member. In use, the anchor-engaging member engages the surface-mounted anchor within the body of the locking device and both the anchor and the bolt securing the anchor-engaging member relative to the locking device are protected from tampering with, for example, bolt cutters.

In another aspect of the invention, a locking-pin adapter for chains (or other securing straps or ropes or the like) includes an end with a pin configured to engage: (1) a box disposed within the body of a locking device and (2) a locking-mechanism bolt disposed within the body of the locking device. The adapter includes an end configured to engage a chain link (or similar link or loop). In another aspect of the invention, the box of the locking device serves to protect the point the adapter engages the link from tampering with, for example, bolt cutters. The body of the locking device also serves to protect the bolt of the locking mechanism from such tampering.

Through practice of various aspects of the invention, a locking device that includes a body designed to protect the critical connection points when securing an item to a surface may be used to provide a secure connection between the item and the surface. The device prevents or deters tampering of the relatively weak connection points with tools such as bolt cutters and pry bars.

BRIEF DESCRIPTION OF THE SEVERAL VIEWS OF THE DRAWING

These and other features, aspects, and advantages of the present invention will become better understood with reference to the following description, appended claims, and accompanying drawings where:

FIGS. 14A and 14B illustrate an exemplary flexible capture member.

FIGS. 15A-15C are views of an exemplary capture-member adapter (locking-pin adapter) that can be used to secure a chain link (or similar link or loop) to a surface-mountable locking device.

FIGS. 22A-22D are views of an exemplary bracket for mounting a locking device to a surface.

DETAILED DESCRIPTION OF THE INVENTION

Figure 1A:
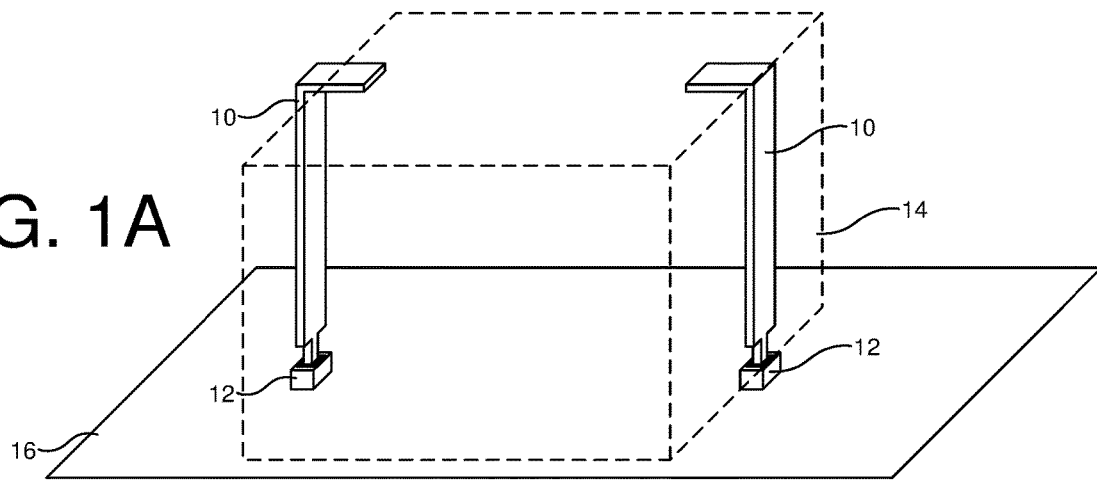
FIG. 1A is a perspective view illustrating an exemplary embodiment of a container-securing device including a surface-mountable locking device (used as the locking member of the container-securing device).

In the summary above, and in the description below, reference is made to particular features of the invention in the context of exemplary embodiments of the invention. The features are described in the context of the exemplary embodiments to facilitate understanding. But the invention is not limited to the exemplary embodiments. And the features are not limited to the embodiments by which they are described. The invention provides a number of inventive features which can be combined in many ways, and the invention can be embodied in a wide variety of contexts. Unless expressly set forth as an essential feature of the invention, a feature of a particular embodiment should not be read into the claims unless expressly recited in a claim.

Except as explicitly defined otherwise, the words and phrases used herein, including terms used in the claims, carry the same meaning they carry to one of ordinary skill in the art as ordinarily used in the art.

Because one of ordinary skill in the art may best understand the structure of the invention by the function of various structural features of the invention, certain structural features may be explained or claimed with reference to the function of a feature. Unless used in the context of describing or claiming a particular inventive function (e.g., a process), reference to the function of a structural feature refers to the capability of the structural feature, not to an instance of use of the invention.

Because one of ordinary skill in the art may best understand the structure of the invention by the environment in which it operates, certain structural features may be explained or claimed with reference to the environment. For example, the structure of a feature of an apparatus may be described or claimed by reference to a workpiece on which the apparatus works. Unless expressly stated otherwise, reference to the environment in a claim is to define the structure of the feature and is not intended to include the referenced environment as a limitation of the claim.

Except for claims that include language introducing a function with "means for" or "step for," the claims are not recited in so-called means-plus-function or step-plus-function format governed by 35 U.S.C. § 112(f). Claims that include the "means for [function]" language but also recite the structure for performing the function are not means-plus-function claims governed by § 112(f). Claims that include the "step for [function]" language but also recite an act for performing the function are not step-plus-function claims governed by § 112(f).

Except as otherwise stated herein or as is otherwise clear from context, the inventive methods comprising or consisting of more than one step may be carried out without concern for the order of the steps.

The terms "comprising," "comprises," "including," "includes," "having," "haves," and their grammatical equivalents are used herein to mean that other components or steps are optionally present. For example, an article comprising A, B, and C includes an article having only A, B, and C as well as articles having A, B, C, and other components. And a method comprising the steps A, B, and C includes methods having only the steps A, B, and C as well as methods having the steps A, B, C, and other steps.

Terms of degree, such as "substantially," "about," and "roughly" are used herein to denote features that satisfy their technological purpose equivalently to a feature that is "exact." For example, a component A is "substantially" perpendicular to a second component B if A and B are at an angle such as to equivalently satisfy the technological purpose of A being perpendicular to B.

Except as otherwise stated herein, or as is otherwise clear from context, the term "or" is used herein in its inclusive sense. For example, "A or B" means "A or B, or both A and B."

Except as is otherwise clear from context: (1) the term "up" is used herein to denote the direction away from the container-side of a surface or toward the side of the surface that is opposite the container side and (2) the term "down" is used herein to denote the direction toward the container-side of the surface or away from the side of the surface that is opposite the container side.

The terms "push locking mechanism" and "plunger locking mechanism" are used herein to denote the class of locks in which the actuator of the locking bolt or recess is controlled by pushing or pulling. Push (or plunger) locking mechanisms are well-known and are described in, for example, U.S. Pat. Nos. 2,046,831 and 5,447,049. Commercial embodiments of such locking mechanisms include, for example, the Tubular Push Locks FJM-2610 by FJM Security (http://www.fjmsecurity.com/Push-Locks.php).

The term "rotating locking mechanism" is used herein to denote the class of locks in which the actuator of the locking bolt or recess is controlled by rotating. Rotating locking mechanisms are well-known and are described in, for example, U.S. Pat. Nos. 5,664,445, 5,992,187, and 7,448,236. Commercial embodiments of such locking mechanisms include, for example, Model No. 2847DAT by Master Lock (http://www.masterlock.com/personal-use/product/2847DAT).

In the context of a locking mechanism, the term "bolt" refers to the component of the locking mechanism that can be moved to engage another component or a workpiece to prevent something from moving or opening (activate) or to disengage another component or a workpiece to allow something to move or open (deactivate). In the context of a locking mechanism, the term "actuator" refers to the component of the locking mechanism that activates or deactivates the bolt.

An exemplary container-securing device is shown in FIG. 1A. A capture member 10 has a pin at one end, which end is oriented down toward a surface 16, and an arm at the other end, which other end is oriented up away from the surface 16. The pin is configured to mate with a box in a locking member 12. The arm is configured to fit snugly against the top of a container 14 when the pin is mated with the box of the locking member 12. The top of the container 14 is the surface of the container 14 that is oriented away from the surface 16. The locking member 12 is fastened to the surface. The locking member 12 is configured to selectively secure the pin in the box so that the pin will not substantially move relative to the box. As such, capture members 10 and locking members 12 may be placed about the container 14 to keep the container from moving relative to the surface 16 during transport. The locking member 12 is optionally configured with a keyed locking mechanism such that a key is needed to secure or release the pin of the capture member 10 from the box of the locking member 12. With such a key-controlled locking member 12, the container 14 may be secured both against movement during transport and against theft. Alternatively, the capture member 10 may be configured with a box end instead of a pin end and locking member 12 may be configured with a pin instead of a box.

Figure 1B:
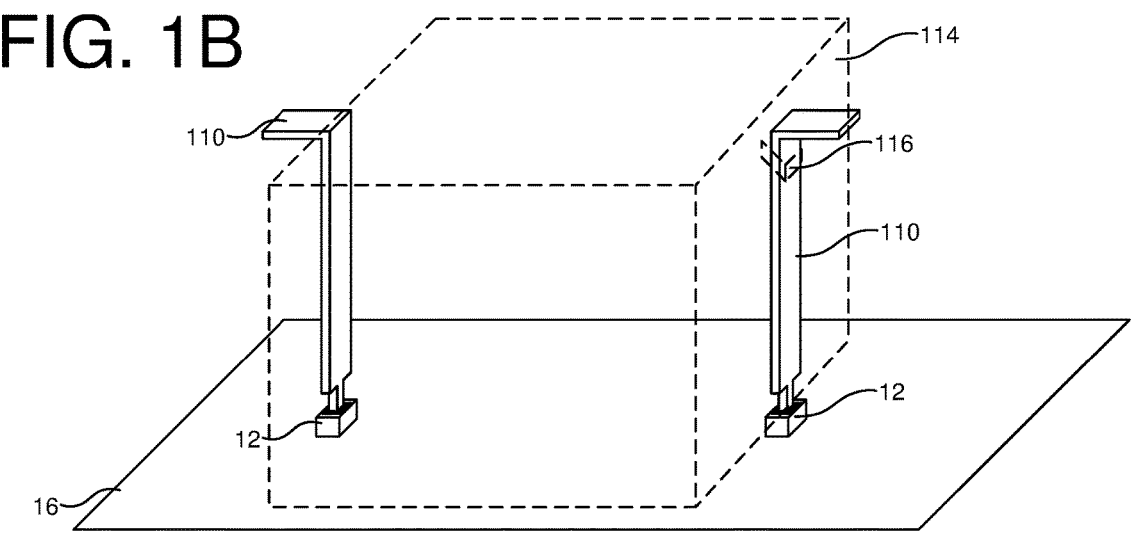
FIG. 1B is a perspective view illustrating another exemplary embodiment of a container-securing device including a surface-mountable locking device.

Another exemplary container-securing device is shown in FIG. 1B. Capture member 110 can be substantially understood with reference to the description of the capture member 10 of the FIG. 1A embodiment. In FIG. 1B, the capture member 110 is further configured to fit snugly against a feature 116 of a side surface of a container 114. Here, the feature 116 is a handle, such as may be used on the side of a chest or a cooler. The feature 116 can also be a hook or a slot, such as may be used to engage a strap or rope, among other things.

Figure 2A:
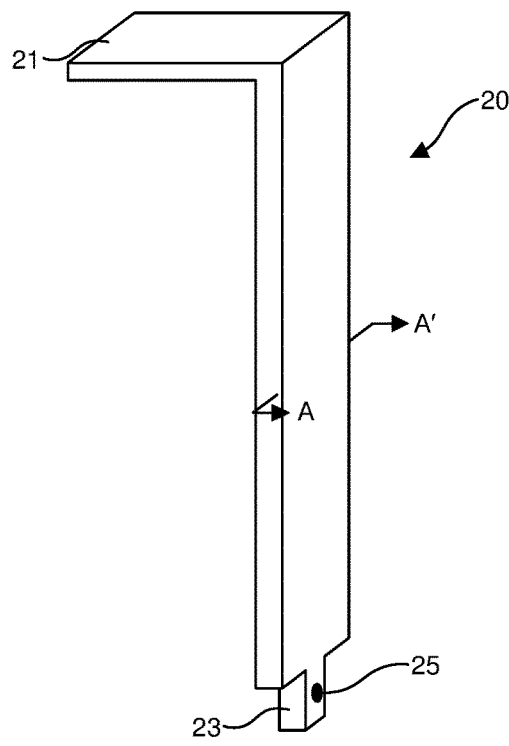
FIGS. 2A-2G are various views illustrating various exemplary embodiments of a capture member of a container-securing device.
Figure 2B:
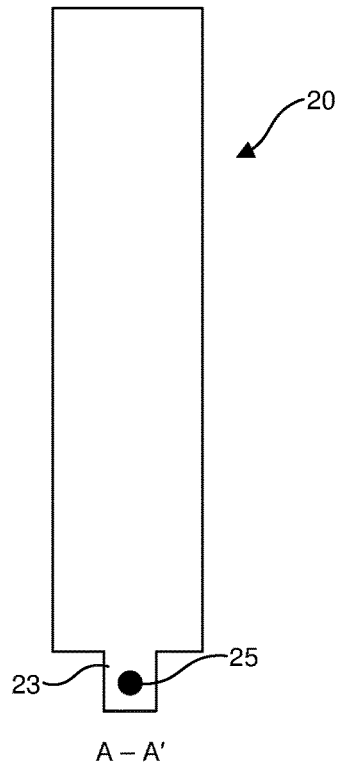

Exemplary capture members are shown in FIGS. 2A-2G. FIG. 2A is a perspective view of an exemplary capture member 20 roughly in the shape of an inverted "L." An arm 21 extends out from the body of the capture member 20, shown here extending at a substantially right angle from the body. A pin 23 includes a hole 25 that engages a bolt in the box of the locking member 12 to selectively secure the pin 23 in the box of the locking member 12. For example, the locking member 12 may comprise a push (or plunger) locking mechanism to control the positioning of a bolt within the hole 25 and secure it in place using a key, thereby preventing movement of the bolt, and any capture member engaged with the bolt, without a key. FIG. 2B is a sectional view of section A-A' of the capture member 20.

Figure 2C:
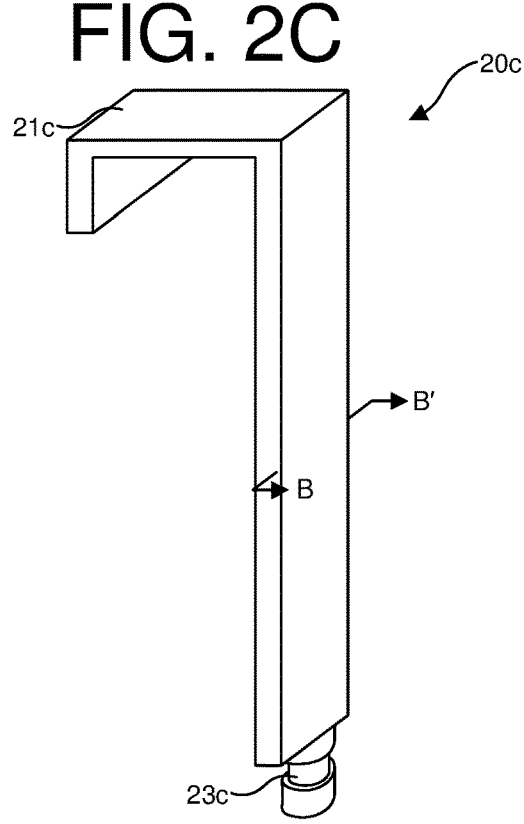
Figure 2D:
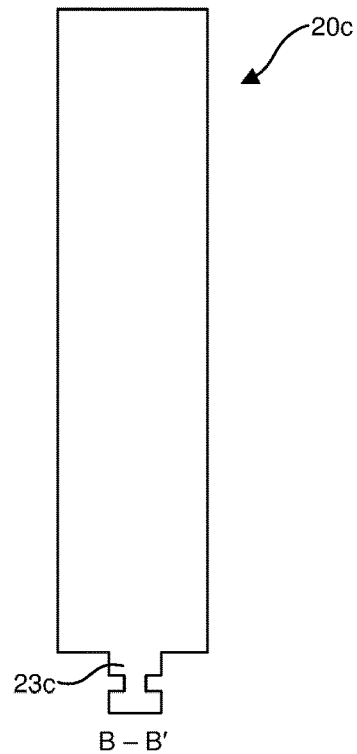

FIG. 2C is a perspective view of an exemplary capture member 20c. In this embodiment, the arm 21c includes a downward oriented portion at its end farthest from the body of the capture member 20c. This downward oriented portion serves as a hook to better secure a feature of a side surface of the secured container, such as the handle 116 shown in FIG. 1B. The pin 23c in this embodiment is shown as including a groove that engages a bolt(s) in the box of the locking member 12 to selectively secure the pin 23c in the box of the locking member 12. For example, the locking member 12 may comprise a push or rotating locking mechanism to control the positioning of a bolt(s) in the groove and secure the bolt(s) in place using a key, thereby preventing movement of the bolt(s), and any capture member engaged with the bolt(s), without a key. FIG. 2D is a sectional view of section B-B' of the capture member 20c.

Figure 2E:
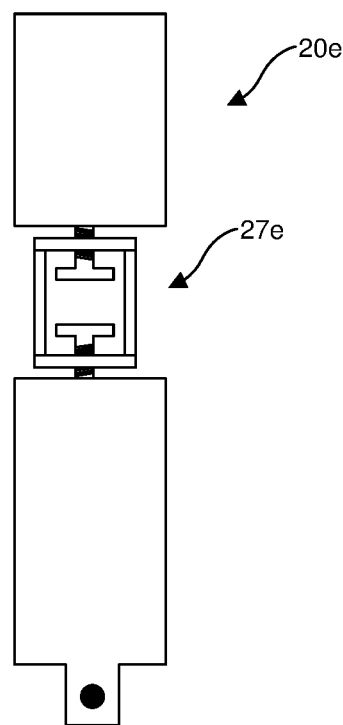

FIG. 2E is a side view of an exemplary capture member 20e. In this embodiment, the capture member 20e is segmented into two pieces joined by a turn-buckle 27e. The turn-buckle 27e can be tightened or loosened to change the length of the capture member 20e. Thus, the capture member 20e is configurable to work with containers of different sizes.

Figure 2F:
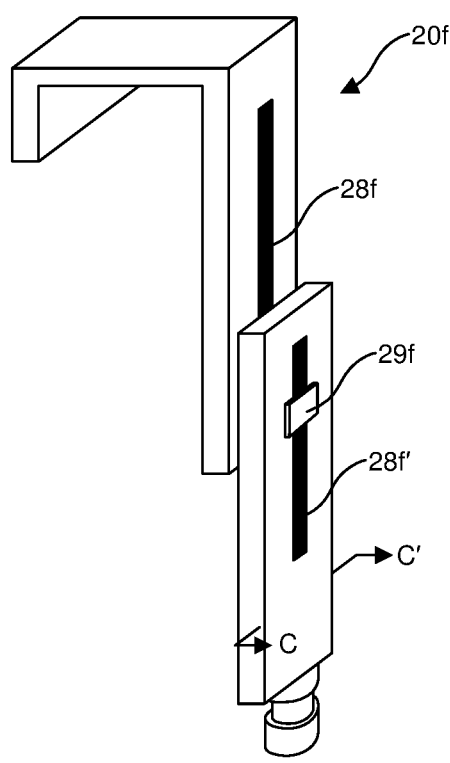
Figure 2G:
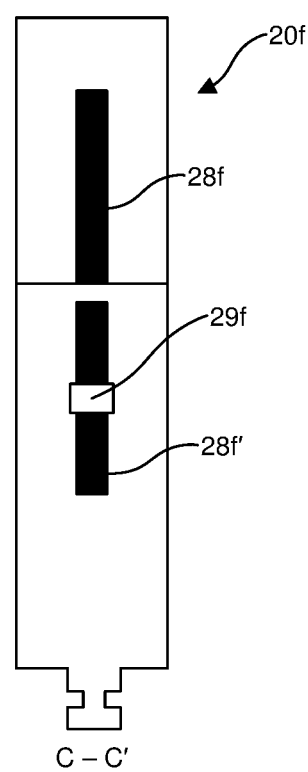

FIG. 2F is a perspective view of an exemplary capture member 20f. In this embodiment, the capture member 20f is segmented into two pieces that are joined by a fastener 29f that runs through slots 28f, 28f cut into the two pieces of the capture member 20f. The fastener 29f may be a bolt, cotter pin, or the like, and it may be keyed, such as a locking lug nut on an automobile wheel is keyed. The capture member 20f can be lengthened or shortened by loosening the fastener 29f, moving the two pieces of the capture member 20f relative to each other, and then tightening the fastener 29f. Thus, capture member 20f is configurable to work with containers of different sizes. FIG. 2G is a sectional view of section C-C' of the capture member 20f.

The capture arm may be made from various materials. For example, the capture arm may be made entirely from metal or plastic or from some combination thereof and it may be made entirely from solid or tubular material or from some combination thereof. The material of the capture arm is not a limiting factor of the invention.

Figure 3A:
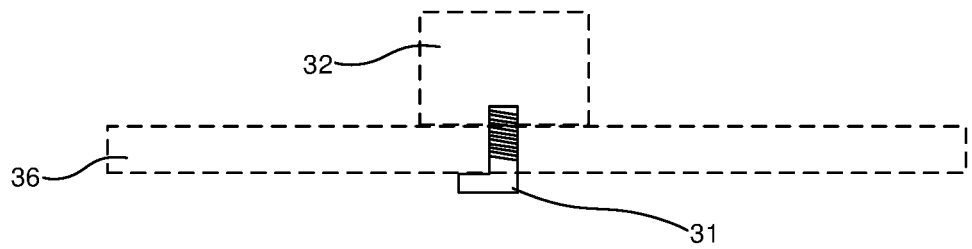
FIGS. 3A-3C are side views illustrating various exemplary embodiments of a locking device that may be used as the locking member of a container-securing device.
Figure 3B:
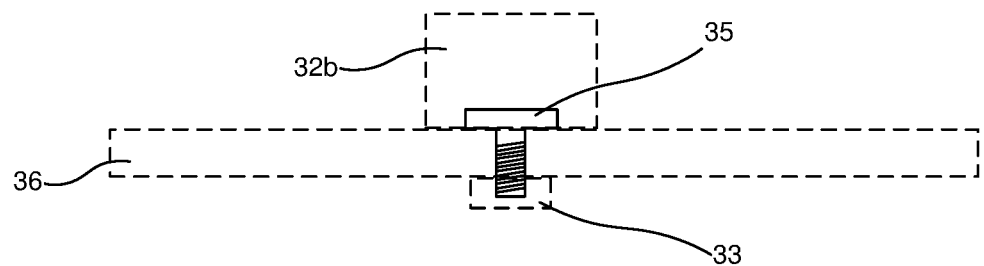
Figure 3C:
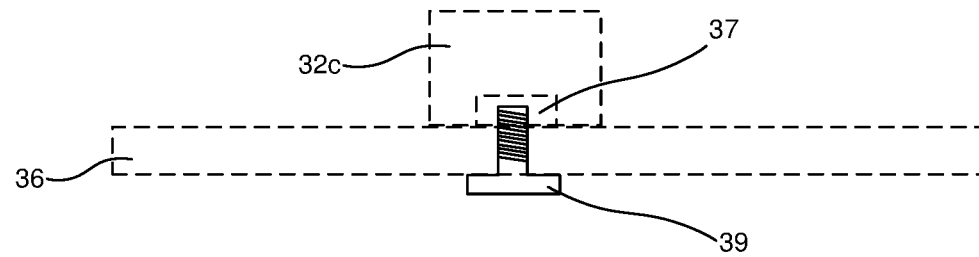

Exemplary surface-mountable locking devices are shown in FIGS. 3A-3C. FIG. 3A is a side view of an exemplary locking device 32 fastened to a surface 36. An "L" shaped bolt 31 is fed up through a hole in the surface 36. Locking device 32 has a threaded hole that is used to thread the locking device 32 onto the bolt 31 to secure the locking device 32 to the surface 36. Alternatively, the bolt 31 may feed through a hole in the locking device 32 and a nut within the locking device 32 can be threaded onto the bolt to fasten the locking device 32 to the surface 36. The surface of the bolt 31 that engages the bottom side of the surface 36 is preferably serrated such that as the locking device 32 is threaded onto the bolt 31 the serrated surface digs into the bottom side of the surface 36 so that the bolt 31 does not rotate with the locking device 32. In this manner, a single person with minimal tools can install the locking device 32 to the surface 36 or remove the locking device 32 from the surface 36.

FIG. 3B is a side view of an exemplary locking device 32b fastened to a surface 36. In this embodiment, a bolt 35 within the locking device 32b is fed down through a hole in the locking device 32b, through a hole in the surface 36, and into a nut 33 on the underside of the surface 36. Alternatively, the bolt 35 may be an integral portion of the locking device 32b. The nut 33 that the bolt 35 threads into is preferably bonded to the bottom side of the surface 36 such that the nut 33 does not have to be held in place and does not rotate with the bolt 35 as the bolt 35 threads into the nut 33. For example, the nut 33 may be made of magnetized material, or embedded in magnetized material, such that it can be bonded to the bottom side of a ferromagnetic surface 36 through a magnetic force. In this manner, a single person with minimal tools can install the locking device 32b to the surface 36 or remove the locking device 32b from the surface 36. Alternatively, the nut 33 may be bonded to the surface 36 with glue, epoxy, or the like, or may be welded to the surface 36.

FIG. 3C is a side view of an exemplary locking device 32c fastened to a surface 36. In this embodiment, a bolt 39 is fed up through a hole in the surface 36, through a hole in the locking device 32c, and into a nut 37 within the locking device 32c. Alternatively, the nut 37 may be an integral part of the locking device 32c (e.g., a threaded hole in the locking device 32c or a nut bonded to the locking device 32c). The bolt 39 that feeds into the nut 37 is preferably bonded to the bottom side of the surface 36 such that the bolt 39 does not have to be held in place and does not rotate with the nut 37 as the nut 37 threads onto the bolt 39. For example, the bolt 39 may be made of magnetized material, or embedded in magnetized material, such that it can be bonded to the bottom side of a ferromagnetic surface 36 through a magnetic force. In this manner, a single person with minimal tools can install the locking device 32c to the surface 36 or remove the locking device 32c from the surface 36. Alternatively, the bolt 39 may be bonded to the surface 36 with glue, epoxy, or the like, or may be welded to the surface 36.

Figure 4A:
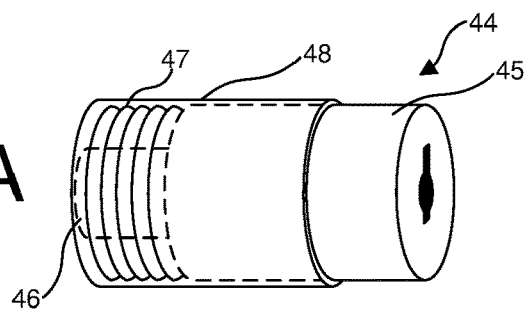
FIGS. 4A-4B are perspective views illustrating an exemplary embodiment of a push (or plunger) locking mechanism.
Figure 4B:
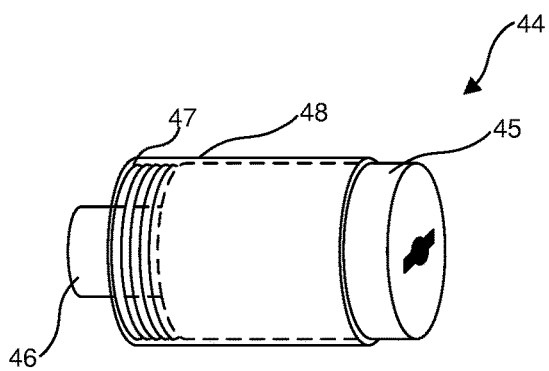

FIG. 4A is a perspective view of an exemplary push (or plunger) locking mechanism 44 that can be included in a surface-mountable locking device. The locking mechanism 44 is shown in the relaxed position. The locking mechanism 44 includes a keyed inner cylinder 45 (the actuator), a bolt 46, and a spring 47 all deployed within an outer cylinder 48. The outer cylinder 48 may be an integral piece of the locking device, or it may be separate from but affixed within the locking device. The bolt 46 is attached to, or is originally formed as an integral member of, the inner cylinder 45. The inner cylinder 45 may slide within the outer cylinder 48 and the spring 47 is deployed such as to compress when the inner cylinder 45 slides into the outer cylinder 48 such that the spring generates a force to push the inner cylinder 45 back toward the relaxed position. When the inner cylinder 45 slides into the outer cylinder 48, the bolt 46 extends from the outer cylinder 48 through a hole in the outer cylinder 48 such that it can engage a box or hole in a capture member's pin. The inner cylinder 45 may be rotated within the outer cylinder 48 by inserting a key into the key hole and turning. In this way, the inner cylinder 45 may be locked into position thereby locking the bolt 46 into position. FIG. 4B depicts the exemplary push (or plunger) locking mechanism 44 locked in a bolt-extended position.

Figure 4C:
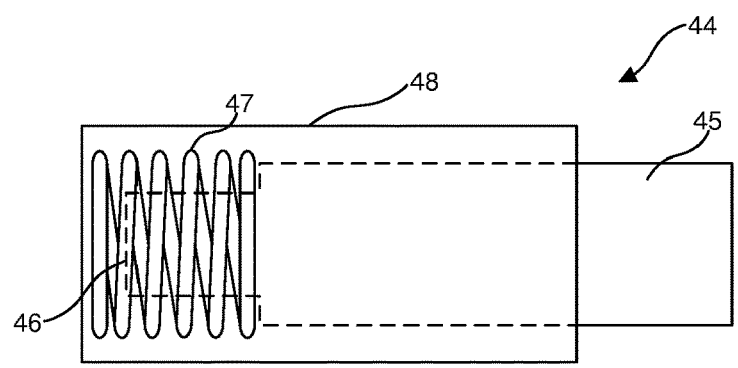
FIGS. 4C-4E are side views illustrating various exemplary embodiments of a push (or plunger) locking mechanism.
Figure 4D:
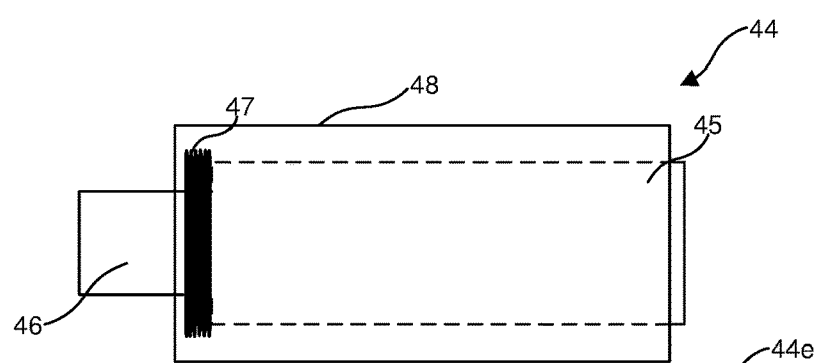
Figure 4E:
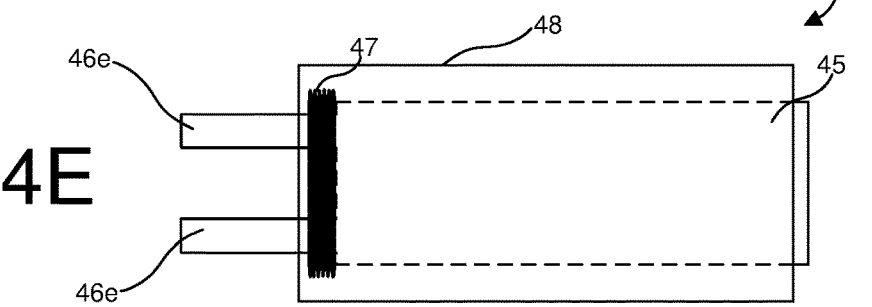

FIG. 4C is a side view of an exemplary push (or plunger) locking mechanism 44 in the relaxed position. FIG. 4D is a side view of an exemplary push (or plunger) locking mechanism 44 in the bolt-extended position. FIG. 4E is a side view of an exemplary push (or plunger) locking mechanism 44e in the bolt-extended position wherein there are two bolts 46e that are configured to engage a groove in a capture member's pin end.

Push (or plunger) locking mechanisms are well-known and are described in, for example, U.S. Pat. Nos. 2,046,831 and 5,447,049. Commercial embodiments of such locking mechanisms include, for example, the Tubular Push Locks FJM-2610 by FJM Security (http://www.fjmsecurity.com/Push-Locks.php). Such prior-art push (or plunger) locking mechanisms may be used within the container-securing device with or in lieu of the exemplary push (or plunger) locking mechanisms described herein. Further, while the above embodiments are described with a keyed inner cylinder 45, the inner cylinder 45 need not be keyed for applications where deterring theft is not important. In such an unkeyed locking mechanism, the inner cylinder 45 may be rotated without a key and moved from the locked, bolt-extended position by, for example, slightly pushing or pulling the inner cylinder 45 into or out of the outer cylinder 48 to unlatch the cylinders.

Figure 5:
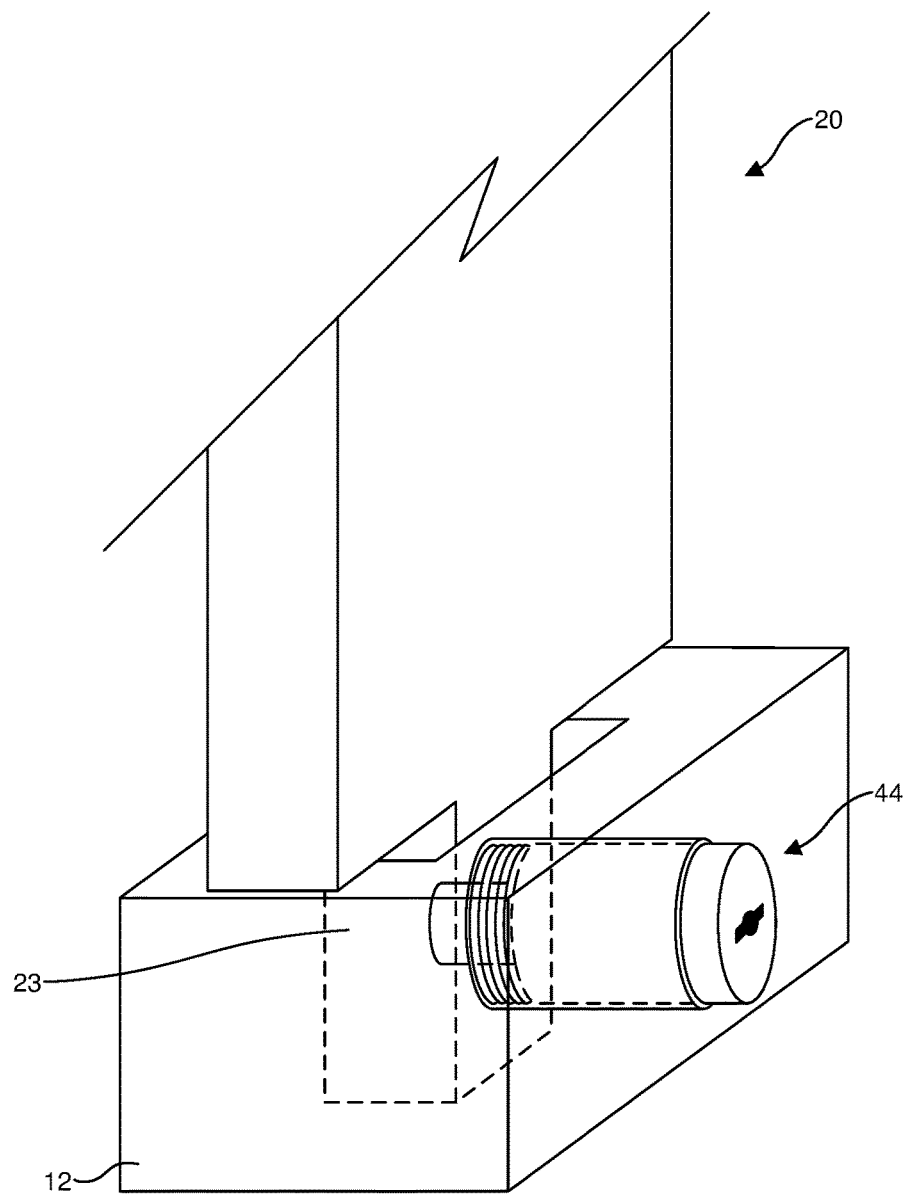
FIG. 5 is a perspective view illustrating an exemplary capture member securely mated with an exemplary locking device comprising a push locking mechanism.

FIG. 5 is a perspective view of an exemplary capture member 20 mated with an exemplary locking member 12 via a hole in the capture member's pin 23 engaging with the bolt of an exemplary push locking mechanism 44 included in the locking member 12.

Figure 6A:
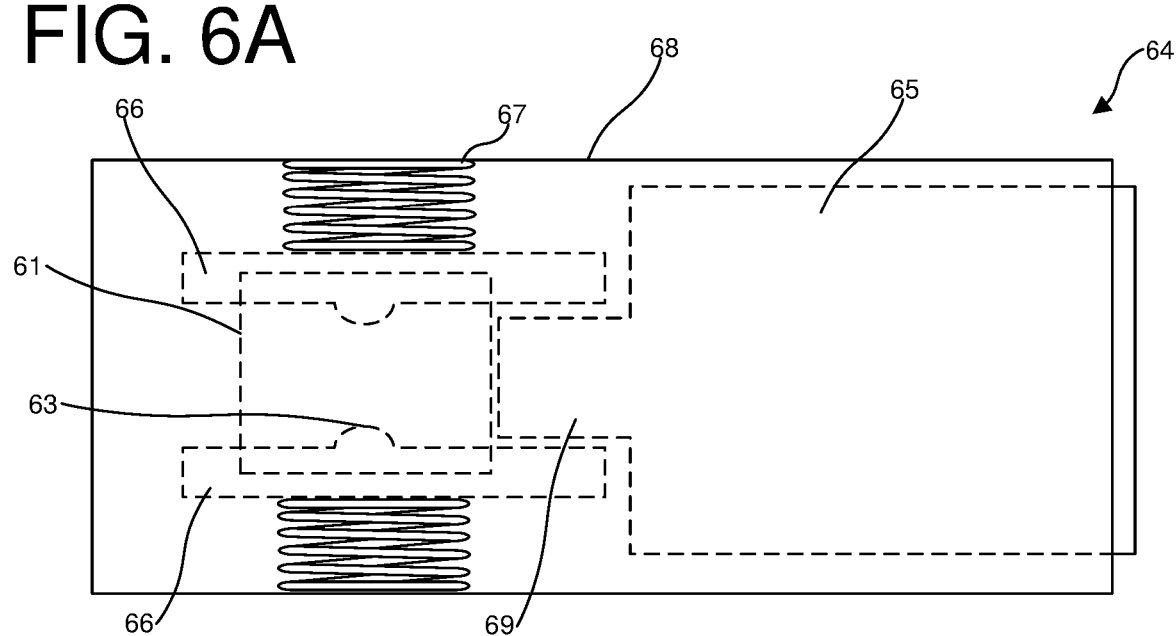
FIGS. 6A-6B are side views illustrating an embodiment of a rotating locking mechanism.
Figure 6B:
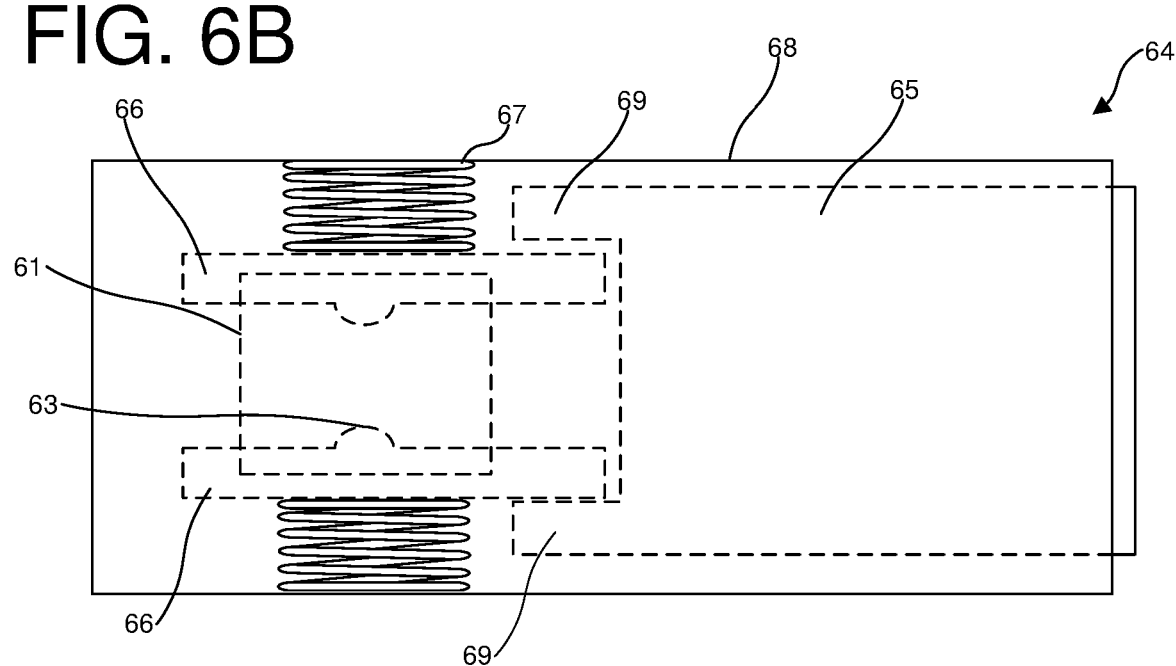

FIGS. 6A-6B are top views of an exemplary rotating locking mechanism 64 that can be included in a locking device. In FIG. 6A, the locking mechanism 64 is shown in the relaxed position. In FIG. 6B, the locking mechanism 64 is shown in the locked position. The locking mechanism 64 includes a keyed inner cylinder 65 (the actuator), bolt-plates 66 (the bolts), and springs 67 all deployed within an outer cylinder 68. The outer cylinder 68 may be an integral piece of the locking device, or it may be separate from but affixed within the locking device. The inner cylinder 65 may rotate within the outer cylinder 68 when the appropriate key is used. The bolt-plates 66 each include a protrusion 63 shaped to engage the groove of the capture member's pin. The inner cylinder 65 includes tabs 69 shaped to rotate to fit between the bolt-plates 66 and the outer cylinder 68 when the locking mechanism 64 is placed in the locked mode. The pin of a capture member enters the locking mechanism 64 through an aperture 61. When the grooves of the capture member's pin engage the protrusions 63, the bolt-plates 66 spread apart to accept or release the capture member's pin. Preferably, the edges of the capture member's pin are beveled to allow a smooth transfer of force from the pin to the bolt-plates 66. Once the protrusions 63 are mated with the grooves of the capture member's pin, the inner cylinder 65 can be rotated to move the tabs 69 between the bolt-plates 66 and the outer cylinder 68 to keep the bolt-plates 66 from spreading apart and thereby locking the capture member in place. This exemplary embodiment is shown with two moving bolt-plates and tabs, but may comprise one or more moving bolt-plates and tabs.

Figure 7A:
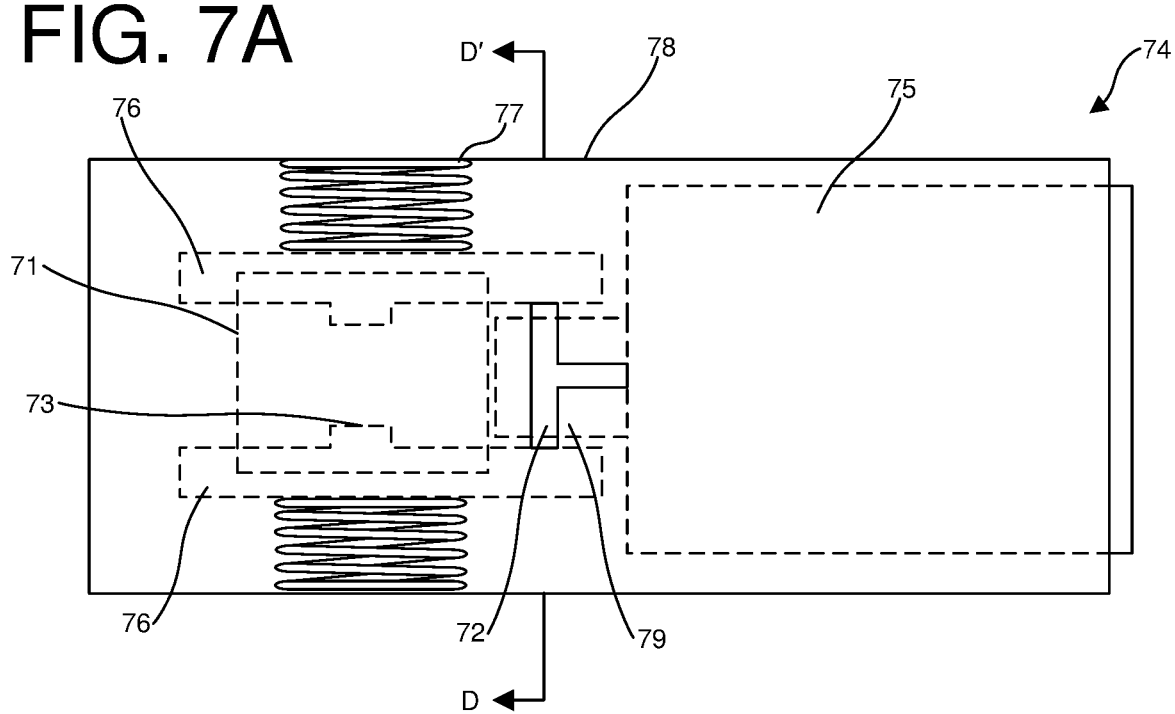
FIGS. 7A-7E are various views illustrating an embodiment of a rotating locking mechanism.
Figure 7B:
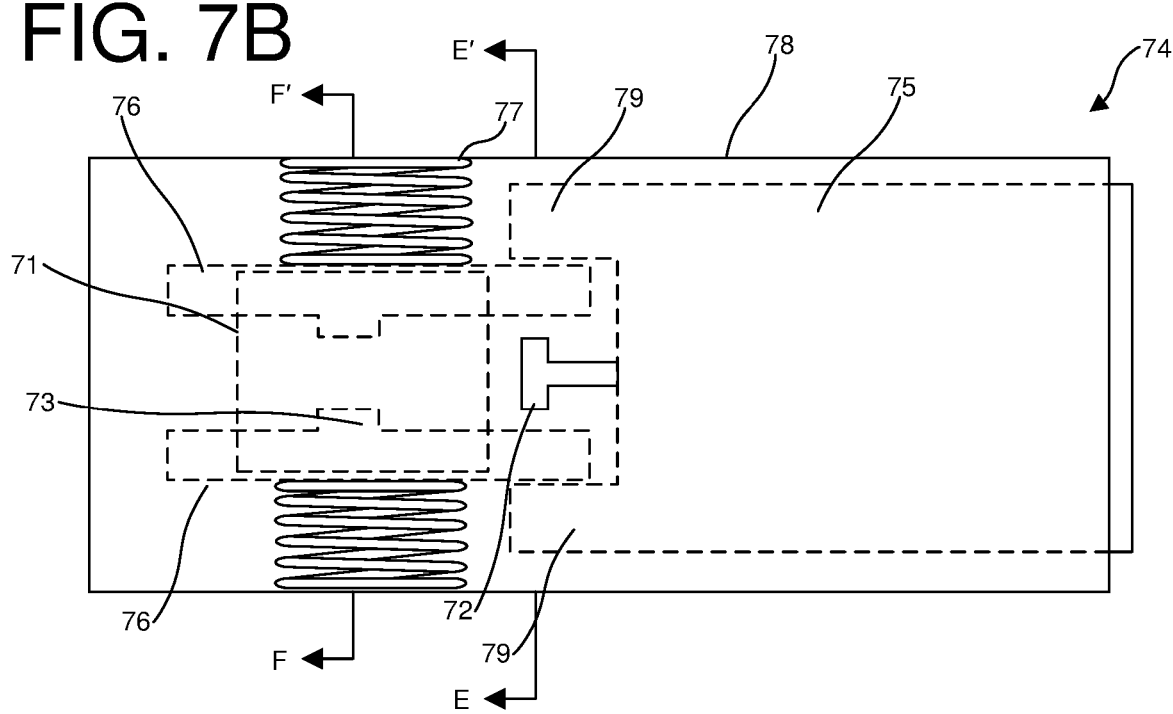
Figure 7C:
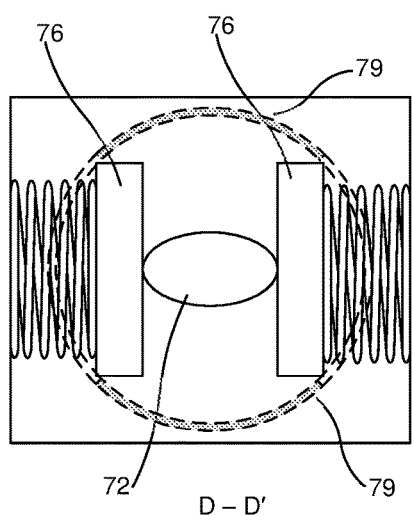
Figure 7D:
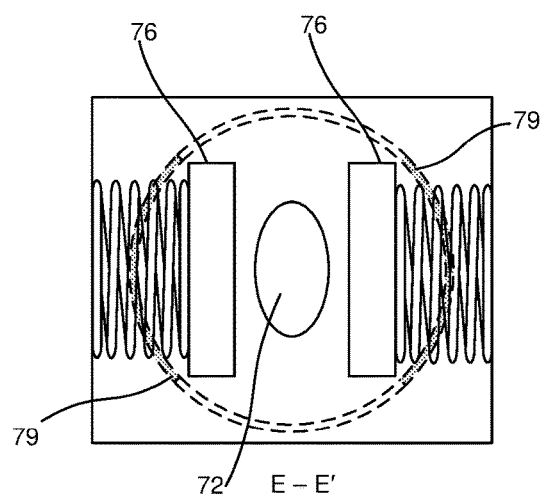
Figure 7E:
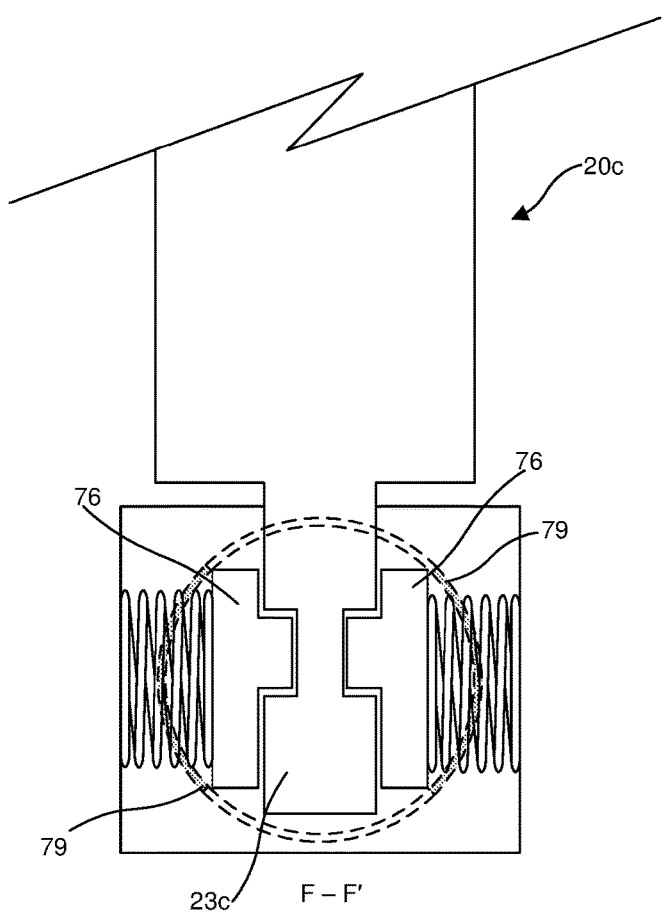

FIGS. 7A-7B are top views of an exemplary rotating locking mechanism 74 that can be included in a locking device. In FIG. 7A, the locking mechanism 74 is shown in the relaxed position. In FIG. 7B, the locking mechanism 74 is shown in the locked position. The locking mechanism 74 includes a keyed inner cylinder 75, bolt-plates 76, and springs 77 all deployed within an outer cylinder 78. The outer cylinder 78 may be an integral piece of the locking device, or it may be separate from but affixed within the locking device. The inner cylinder 75 may rotate within the outer cylinder 78 when the appropriate key is used. The bolt-plates 76 each include a protrusion 73 shaped to engage the groove of the capture member's pin. The inner cylinder 75 includes tabs 79 shaped to rotate to fit between the bolt-plates 76 and the outer cylinder 78 when the locking mechanism 74 is placed in the locked mode. The inner cylinder 75 further includes a cam 72 shaped to spread the pin-plates 76 apart when in the relaxed mode and allow them to come together when in the locked mode. The pin of a capture member enters the locking mechanism 74 through an aperture 71. Rotating the inner cylinder 75 from the relaxed to the locked position will: (1) rotate the cam 72 to allow the bolt-plates 76 to move together and the protrusions 73 on the bolt-plates 76 to engage the grooves on the pin of the capture member and (2) move the tabs 79 into a position between the bolt-plates 76 and the outer cylinder 78 to keep the bolt-plates 76 from moving apart and thereby lock the capture member in place. Rotating the inner cylinder 75 from the locked to the relaxed position will: (1) move the tabs 79 away from between the bolt-plates 76 and the outer cylinder 78 and (2) rotate the cam 72 to spread the bolt-plates 76 apart to accept or release the pin of the capture member. FIG. 7C is an end sectional view of section D-D' of FIG. 7A when the locking mechanism 74 is in the relaxed position, and the capture member's pin may be inserted into the locking mechanism. FIG. 7D is an end sectional view of section E-E' of FIG. 7B when the locking mechanism 74 is in the locked position, and the capture member's pin is secured in place within the locking mechanism 74. FIG. 7E is an end sectional view of section F-F' of FIG. 7B when the locking mechanism 74 is in the locked position, and the capture member's pin 23c is secured in place within the locking mechanism 74. This exemplary embodiment is shown with two moving bolt-plates and tabs, but may comprise one or more moving bolt-plates and tabs.

Rotating locking mechanisms are well-known and are described in, for example, U.S. Pat. Nos. 5,664,445, 5,992,187, and 7,448,236. Commercial embodiments of such locking mechanisms include, for example, Model No. 2847DAT by Master Lock (http://www.masterlock.com/personal-use/product/2847DAT). Such prior-art rotating locking mechanisms may be used within the container-securing device with or in lieu of the exemplary rotating locking mechanisms described herein. Further, while the above embodiments are described with a keyed inner cylinder, the inner cylinder need not be keyed for applications where deterring theft is not important. In such an unkeyed locking mechanism, the inner cylinder may be rotated without a key and moved from the locked position by, for example, slightly pushing or pulling the inner cylinder into or out of the outer cylinder to unlatch the cylinders.

Figure 8A:
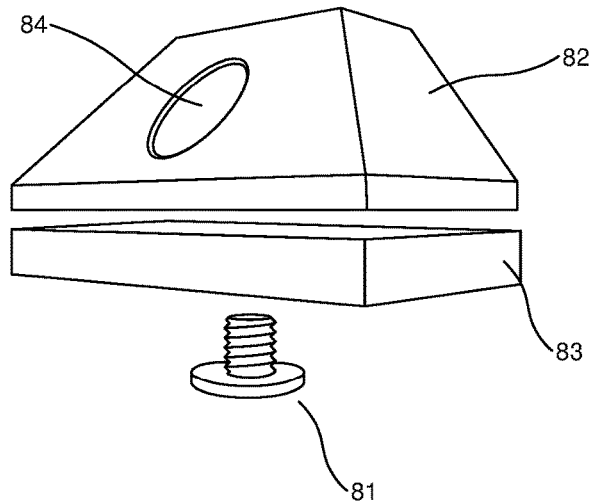
FIGS. 8A-8C are various views illustrating embodiments of a surface-mountable locking device.
Figure 8B:
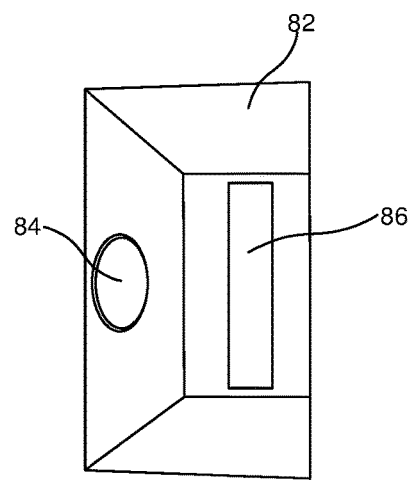
Figure 8C:
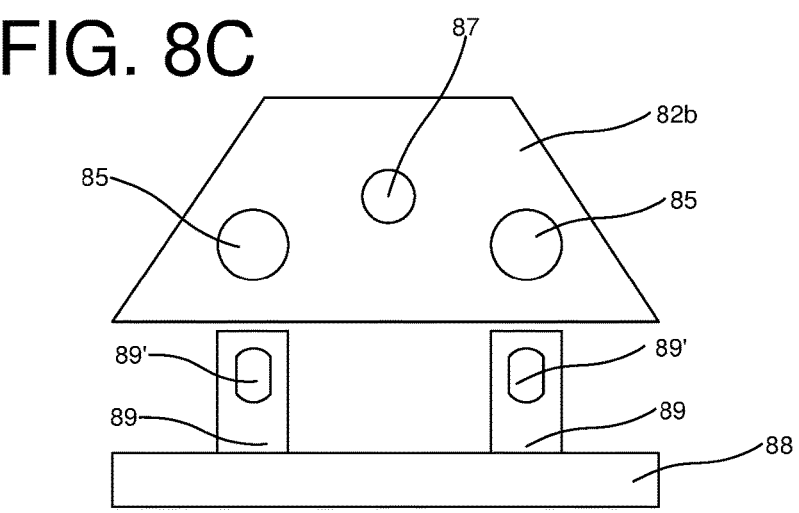

Exemplary locking devices are shown in FIGS. 8A-8C. FIG. 8B is a perspective view of an exemplary locking device 82 showing a hole 84 for positioning and retaining a locking mechanism. This exemplary locking device 82 may be fastened to a surface using a plate 83 which retains a bolt 81. The locking device 82 is placed above the surface and the plate 83 and bolt 81 are placed below the surface such that the bolt 81 feeds up through the surface and into the locking device 82, securing the locking device 82 to the surface. The plate 83 may be magnetized to adhere to the surface or may otherwise be held in position to fasten the locking device 82. The locking device 82 may be fastened to the surface using more than one bolt 81. FIG. 8B is a top view of the exemplary locking device 82 showing a box 86 configured to mate with a pin of a capture member.

FIG. 8C is side view of an exemplary locking device 82b, viewing the side of the locking device 82b that is opposite the side from which the locking mechanism is accessed by the user. This exemplary locking device 82b includes a hole 87 to accept the bolt of a push locking mechanism. This hole 87 may be accessible from outside the box of the locking device 82b, as shown in FIG. 8C, or it may be covered by a plate or a portion of the body of the locking device 82b. The locking device 82b may be fastened to a surface using a plate 88 that includes upward protruding pins 89 that feed up through the surface and into the locking device 82b. Pins (e.g., bare or threaded bolts) are fed through holes 85 in the locking device 82b and into holes 89' in the upward protruding pins 89 of the plate 88. The plate 88 may include one or more upward protruding pins 89. The plate 88 may be magnetized so as to adhere to the surface or may otherwise be held in position to fasten the locking device 82b. In this embodiment, the means used to fasten or remove the locking device 82b to the surface will not be accessible when a container is secured to the surface—access to the fastening/removing means is blocked by the container. Other views of exemplary locking device are included in applicant's U.S. design-patent application Ser. No. 29/594,140 (patent No. D811,196), No. 29/594,142 (patent No. 811,197), No. 29/601,711 (patent No. D817,147), and No. 29/633,631, each of which is incorporated herein by reference.

Figure 9A:
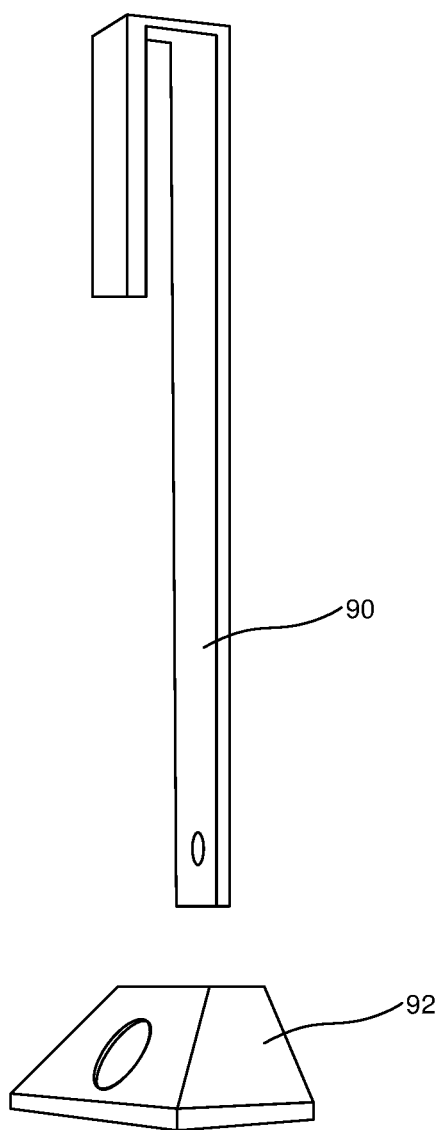
FIGS. 9A-9B are perspective views illustrating an exemplary capture member mated with an exemplary surface-mountable locking device.
Figure 9B:
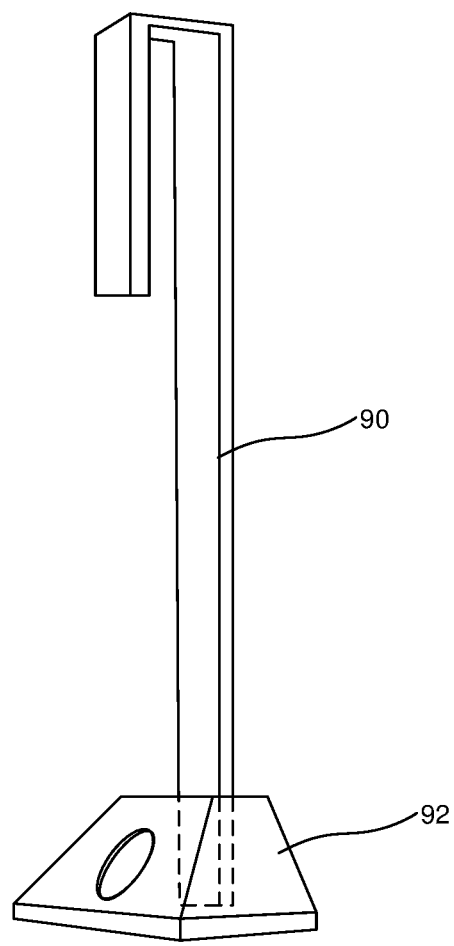

FIGS. 9A-9B are perspective views of an exemplary capture member 90 and locking member 92 of a container-securing device. FIG. 9A shows the capture member 90 and the locking member 92 as separated. FIG. 9B shows the capture member 90 and the locking member 92 mated such as to secure a container to a surface.

Figure 10A:
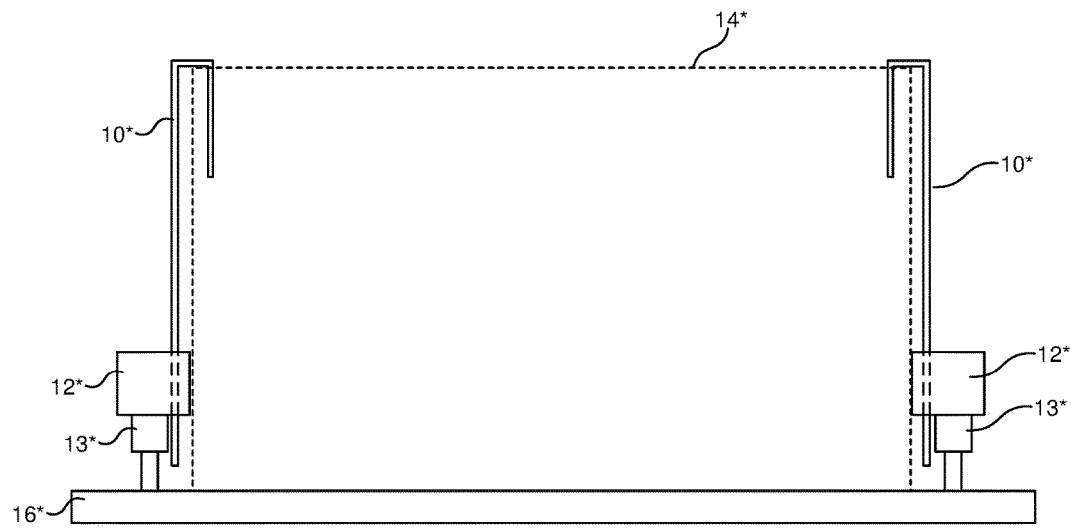
FIGS. 10A and 10B are, respectively, front and perspective views illustrating an exemplary embodiment of a container-securing device for use with a railed surface.
Figure 10B:
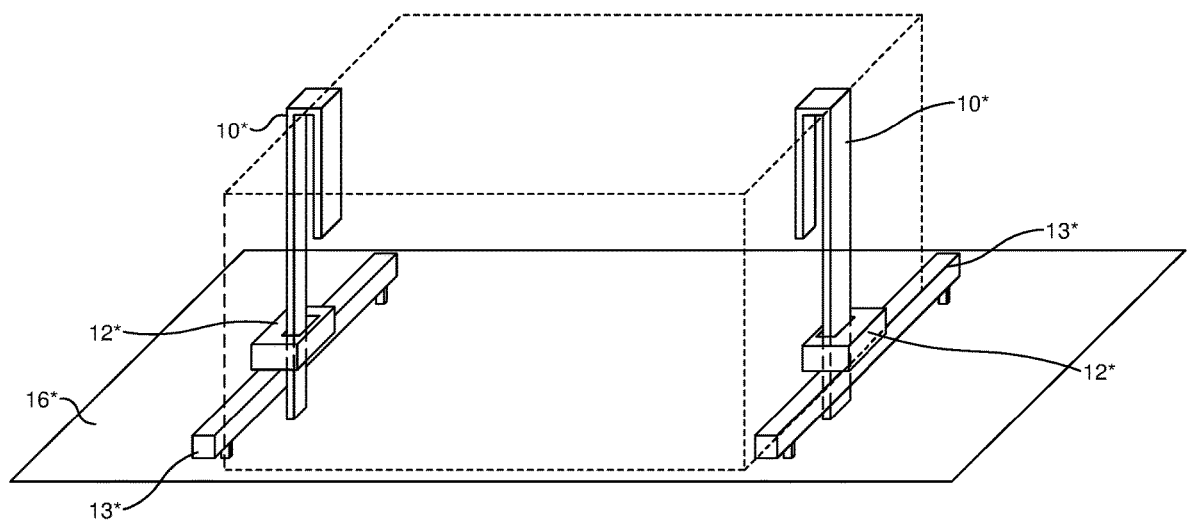

An exemplary container-securing device is shown in FIGS. 10A and 10B. FIG. 10A is a front-side view illustrating a container 14* secured to a surface 16* having rails 13*, such as might be found on a watercraft, for example. FIG. 10B is a perspective view of the container 14* secured to the surface 16*. Capture members 10* are configured at one end to engage a locking member 12* and at the other end to engage a slot in the container 14*. The locking members 12* may be mounted to the rails in a manner akin to how the locking members 32, 32b, 32c are mounted to the surface 36 as shown in FIGS. 3A-3B. For example, a locking member 12* may be bolted to a rail 13* using a bolt placed through a hole in the rail 13* or the using a U-shaped bolt placed around the rail 13*.

Figure 11A:
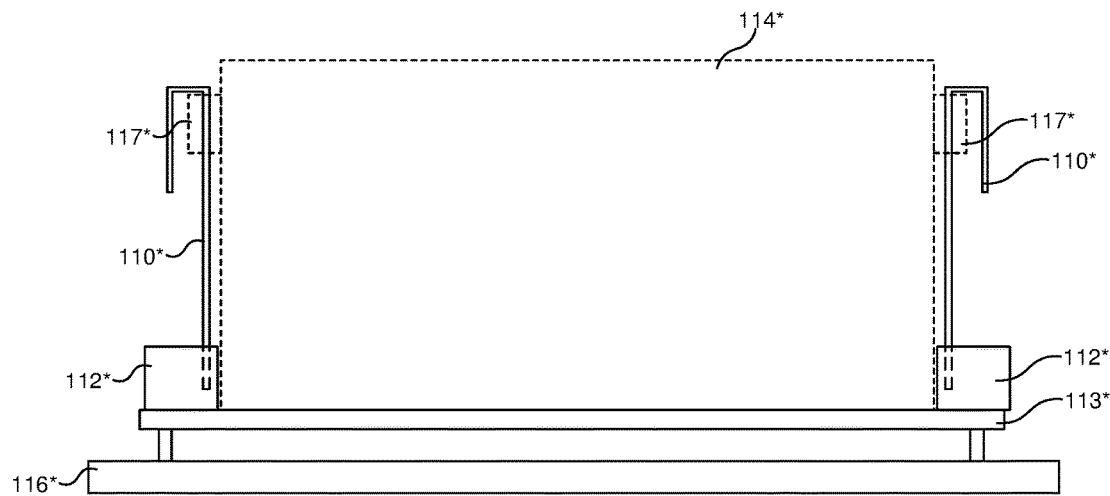
FIGS. 11A and 11B are, respectively, front and perspective views illustrating an exemplary embodiment of a container-securing device for use with a railed surface.
Figure 11B:
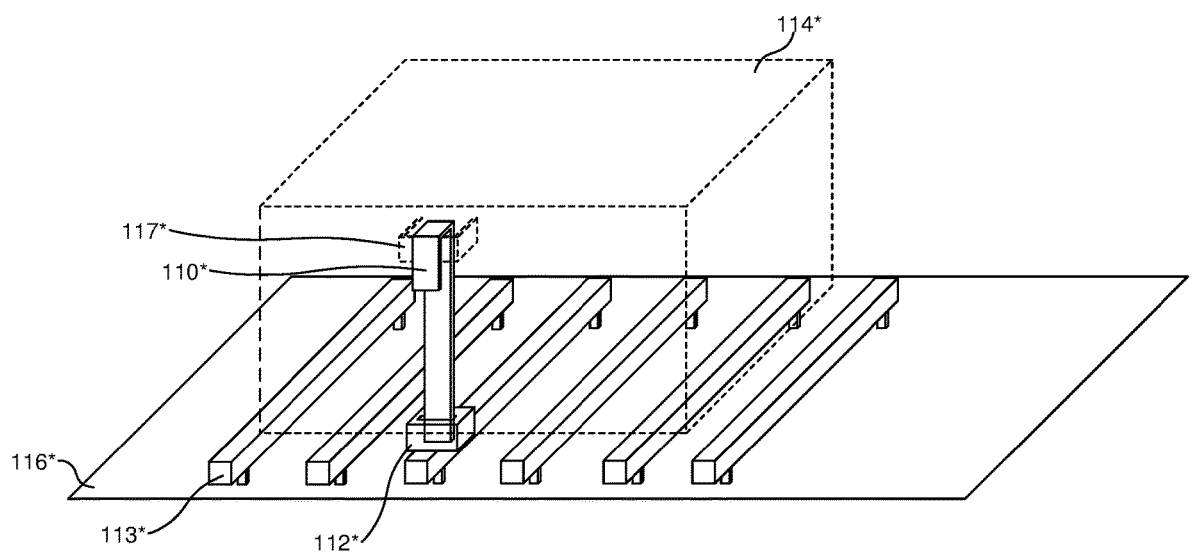

Another exemplary container-securing device is shown in FIGS. 11A and 11B. FIG. 11A is a right-side view illustrating a container 114* secured to a transport surface 116* having rails 113*, such as might be found on the roof of a sport utility vehicle, for example. FIG. 11B is a perspective view of the container 114* secured to the surface 116*. Capture members 110* are configured at one end to engage a locking member 112* and at the other end to engage a feature 117* of a side surface of the container 114*, such as a handle on a chest or cooler, for example. The locking members 112* may be mounted to the rails in a manner akin to how the locking members 32, 32b, 32c are mounted to the surface 36 as shown in FIGS. 3A-3B. For example, a locking member 112* may be bolted to a rail 113* using a bolt placed through a hole in the rail 113* or the using a U-shaped bolt placed around the rail 113*.

Figure 12A:
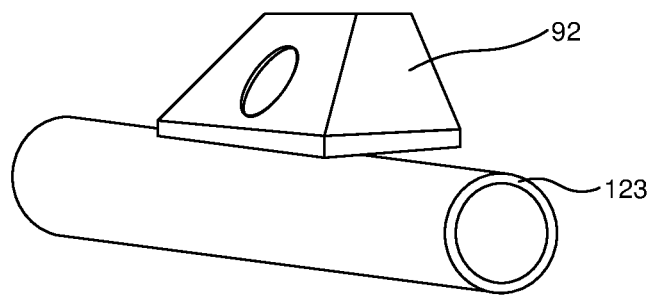
FIGS. 12A-12C are various views illustrating embodiments of a surface-mountable locking device shown mounted to a railed surface.
Figure 12B:
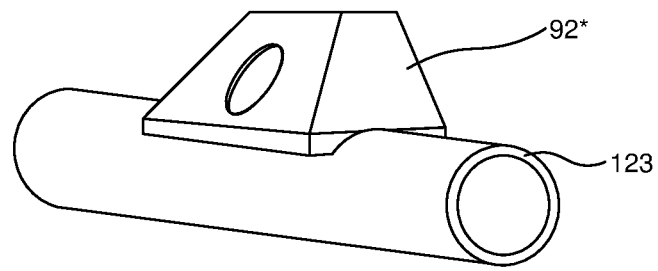
Figure 12C:
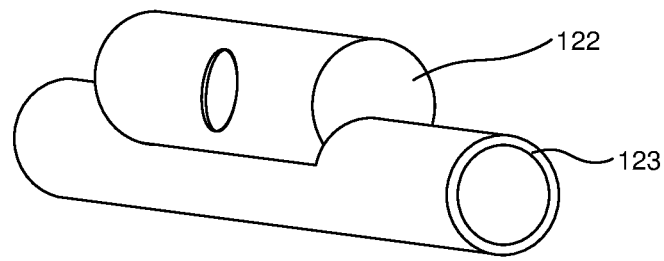

Exemplary railing-mounted locking devices are illustrated in FIGS. 12A-12C. FIG. 12A is a perspective view of an exemplary locking device 92 mounted to a railing 123 comprising a circular tube. FIG. 12B is a perspective view of an exemplary locking device 92* mounted to a railing 123 comprising a circular tube. The locking device 92* depicted in FIG. 12B includes a feature of the bottom surface that is configured to nest with the railing 123. FIG. 12C is a perspective view of an exemplary locking device 122 mounted to a railing 123 comprising a circular tube. The locking device 122 depicted in FIG. 12C includes a feature of the bottom surface that is configured to nest with the railing 123. The railing 123 is depicted as a circular tube, but it could equivalently be of any cross-sectional shape and be solid or tubular. A surface of a locking device is "configured to nest" with the railing when the contour of the surface of the locking device is complementary to the contour of the surface of the railing. For example, if the railing 123 is a circular tube, the locking device 122 would be configured to nest with railing 123 if it included a cut-out in the shape of a circle (or part of a circle) of roughly the same diameter as the outer diameter of the railing 123.

Figure 13A:
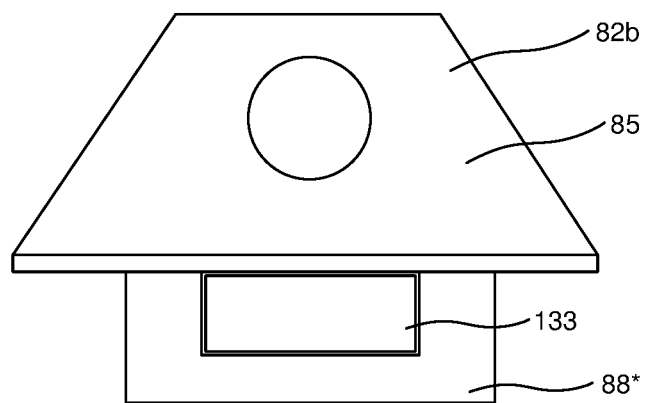
FIGS. 13A and 13B are front and back views, respectively, illustrating an embodiment of a surface-mountable locking device configured to mount to a railed surface.
Figure 13B:
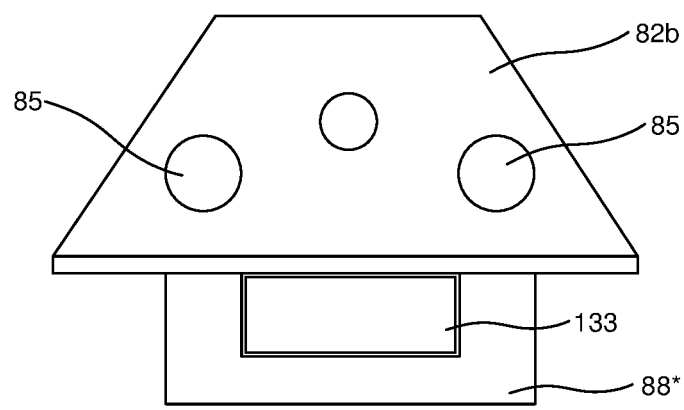

Another exemplary railing-mounted locking device is illustrated in FIGS. 13A-13B. FIG. 13A is a front-side view of a locking device 82b mounted to a railing 133 comprising a rectangular solid member. A pin 88* is configured to nest with the railing 133 and is used to attach the locking device 82b to the railing. FIG. 13B is a back-side view of the locking device 82b mounted to the railing 133. The locking device 82b is as previously described and depicted in FIG. 8C. To mount the locking device 82b to the railing, pin 88* is placed around the railing 133 and into the locking device 82b and secured using pins inserted through holes 85, as described with reference to FIG. 8C.

An exemplary flexible capture member of a container-securing device is illustrated in FIGS. 14A-14B. The flexible capture member 140 is comprised of a series of hinged plates 140c connected by hinges 140f. The top plate 140d includes a frame defining a space 140e through which the hinged plates 140c may pass, looping through like a belt strap through a buckle. The bottom plate 140a is configured as a pin to fit in the box of a locking device 142 and includes a hole 140b to engage a locking-mechanism bolt 145b in the box of the locking device 142. In use, the flexible capture member 140 may, for example, be looped through a feature 147 on a container 144, through the space 140e in the top plate, and the bottom plate 140a inserted into the box of the locking device 142 mounted to a surface 146 with a threaded bolt 149. A locking mechanism 145 is actuated so that the locking-mechanism bolt 145b engages the hole 140b in the bottom plate 140a, and thereby secures the capture member 140 in the locking device 142 and the container 144 to the surface 146.

Exemplary capture-member adapters (locking-pin adapters) are illustrated in FIGS. 15A-15C, 16A-16B, 17A-17B, and 18. These capture-member adapters are configured to connect one or more chain links (or similar links or loops) to a surface-mountable locking device.

In FIGS. 15A-15C, a capture-member adapter 156 includes a first portion 156a configured to fit about a chain link 158 (or similar link or loop) and a second portion 156d configured as a pin to fit in the box of a surface-mountable locking device 152. The first portion of the capture-member adapter 156a includes a front hole 156b and a back hole 156c through which a pin 153 (e.g., a smooth or threaded bolt) can be placed to secure the link 158 within the first portion of the capture-member adapter 156a. For example, a threaded bolt can be fed through the front hole in the adapter, through the hole in the link, through the back hole in the adapter, and secured with a break-away nut. Similarly, a smooth bolt may be fed through the front hole in the adapter, through the hole in the link, and pressed into a too-small back hole in the adapter to form an interference fit to retain the bolt in place. The front hole 156b is configured to accept all or a portion of the head of the pin 153, thereby protecting the pin from cutting tools such as bolt cutters. The second portion of the capture-member adapter 156d includes a hole 156e to engage a locking-mechanism bolt in the box of the locking device 152. The locking-mechanism bolt is protected by the locking device 152 from cutting tools such as a bolt cutter. The second portion 156d may be further configured to fit through the hole in a link 154. The capture-member adapter 156 may be used, for example, to connect multiple chains or ropes to the locking device 152. Or it may be used to connect one chain to the locking device 152 and allow for variance as to which links in the chain are connected—thereby allowing a user to vary the effective length of the chain by selecting a different link to mate with the bottom portion 156d. Thus, the capture-member adapter 156 can adapt chains (or ropes or straps with end links or loops) for use with the surface-mountable locking device 152 and protect the locking-mechanism bolt from cutting tools. This is an improvement over the prior-art technique of looping a padlock through chain links and an anchor loop, which exposes the padlock's bolt and the anchor loop to cutting tools. (The term DENY in the figures is applicant's trademark.)

Figure 16A:
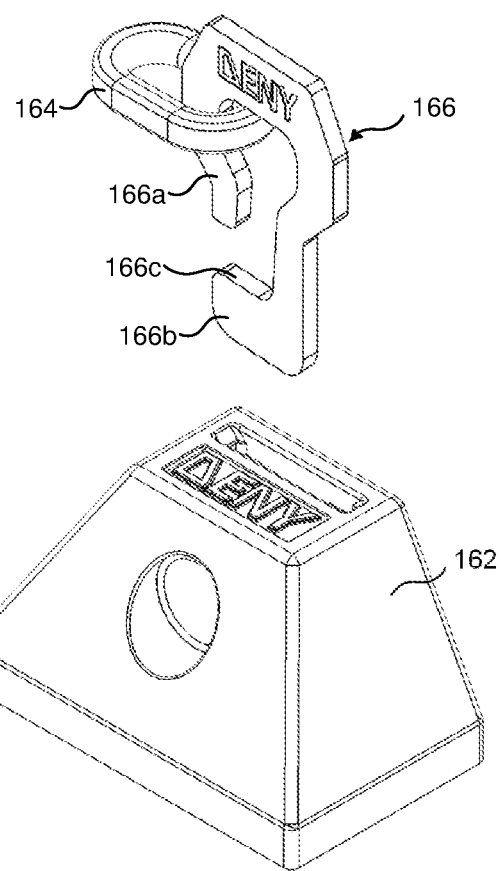
FIGS. 16A-16B are views of an exemplary capture-member adapter (locking-pin adapter) that can be used to secure a chain link (or similar link or loop) to a surface-mountable locking device.
Figure 16B:
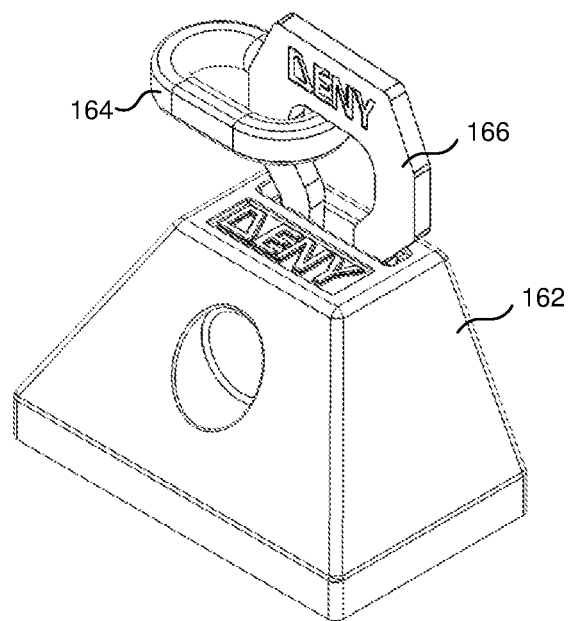

In FIGS. 16A-16B, a capture-member adapter 166 includes a first hook portion 166a and a second hook portion 166b that together form a hook configured to engage a chain link 164 (or similar link or loop). The second portion 166b is configured as a pin to fit in the box of a surface-mountable locking device 162 and to engage a locking-mechanism bolt in the box of the locking device 162. In this illustrated embodiment, the bottom surface of the locking-mechanism bolt would engage a surface 166c of the second portion 166b. Equivalently, the second portion 166b may include a hole to engage the locking-mechanism bolt. In use, a link 164 may be placed through the open side of the hook formed by the first portion 166a and the second portion 166b such that the first portion 166a passes through the center hole portion of the link 164. The first portion 166a of the adapter 166 fits within the box of the locking device 162 such that the open side of the hook defined by the top portion 166a and bottom portion 166b is wholly within the box of the locking device 162 and is thereby protected by the locking device 162.

Figure 17A:
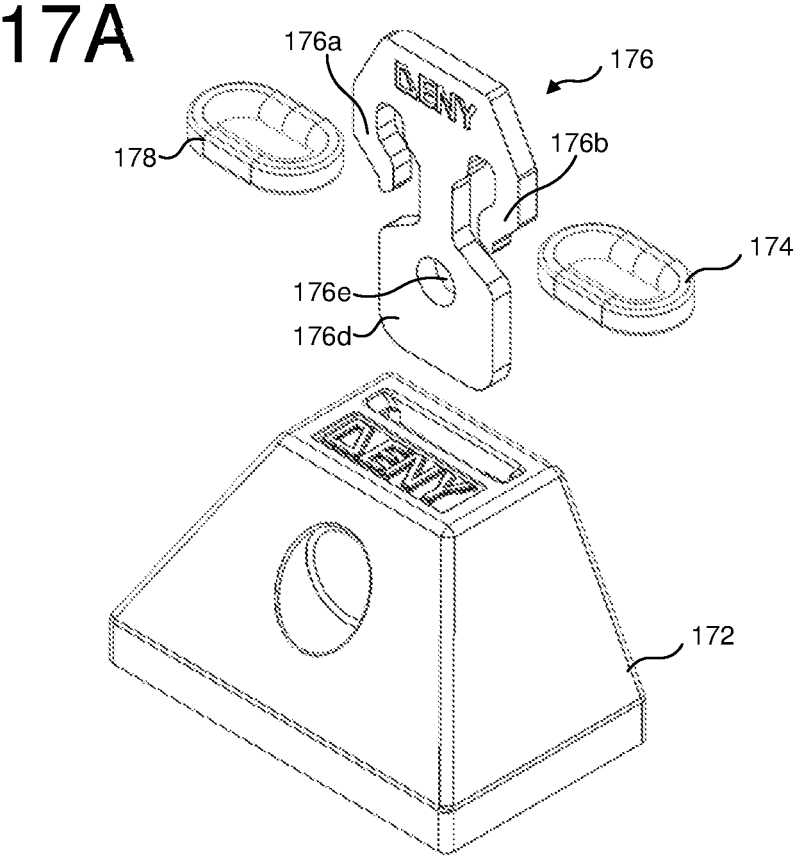
FIGS. 17A-17B are views of an exemplary capture-member adapter (locking-pin adapter) that can be used to secure a chain link (or similar link or loop) to a surface-mountable locking device.
Figure 17B:
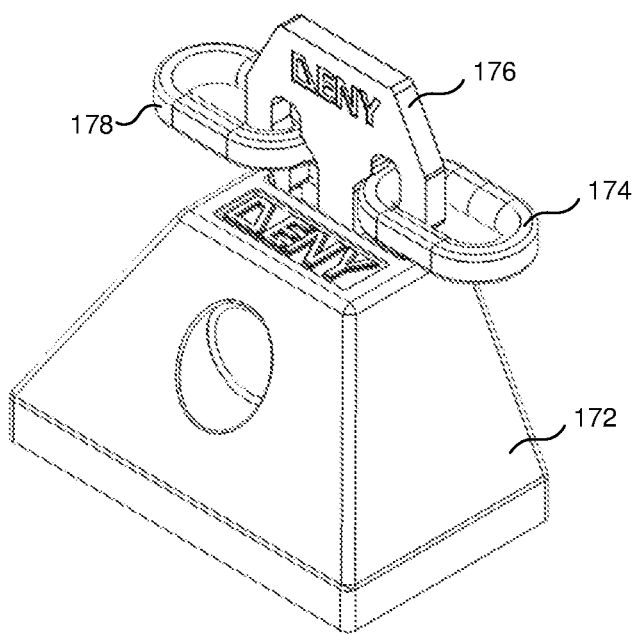

In FIGS. 17A-17B, a capture-member adapter 176 includes a first portion 176a, a secon portion 176b, and a third portion 176d. The first portion 176a and the third portion 176d together form a first hook configured to receive a chain link 178 (or similar link or loop). The second portion 176b and the third portion 176d together form a second hook configured to receive a second chain link 175 (or similar link or loop). The third portion 176d is configured as a pin to fit in the box of a surface-mountable locking device 172 and includes a hole 176e configured to engage a locking-mechanism bolt in the box of the locking device 172. The first portion 176a and the second portion 176b of the adapter 176 fit within the box of the locking device 172 such that the open sides of the first and second hooks are wholly within the box of the locking device 172 and are thereby protected by the locking device 172.

Figure 18A:
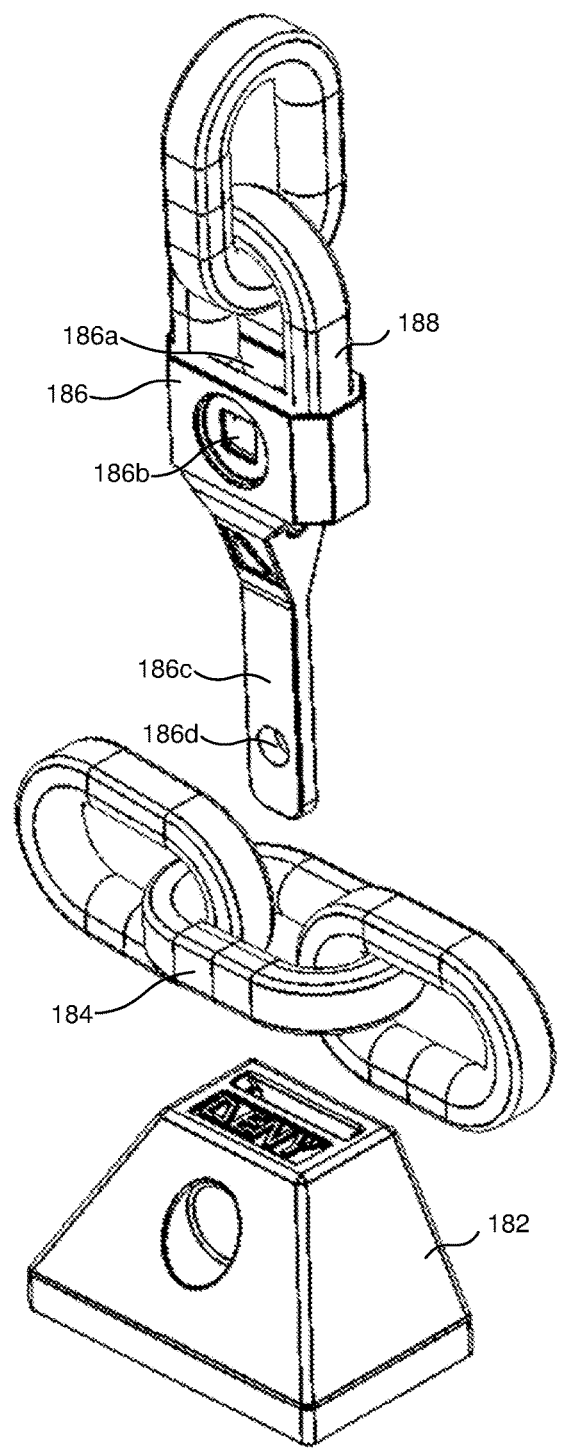
FIGS. 18A-18B are views of an exemplary capture-member adapter (locking-pin adapter) that can be used to secure a chain link (or similar link or loop) to a surface-mountable locking device.
Figure 18B:
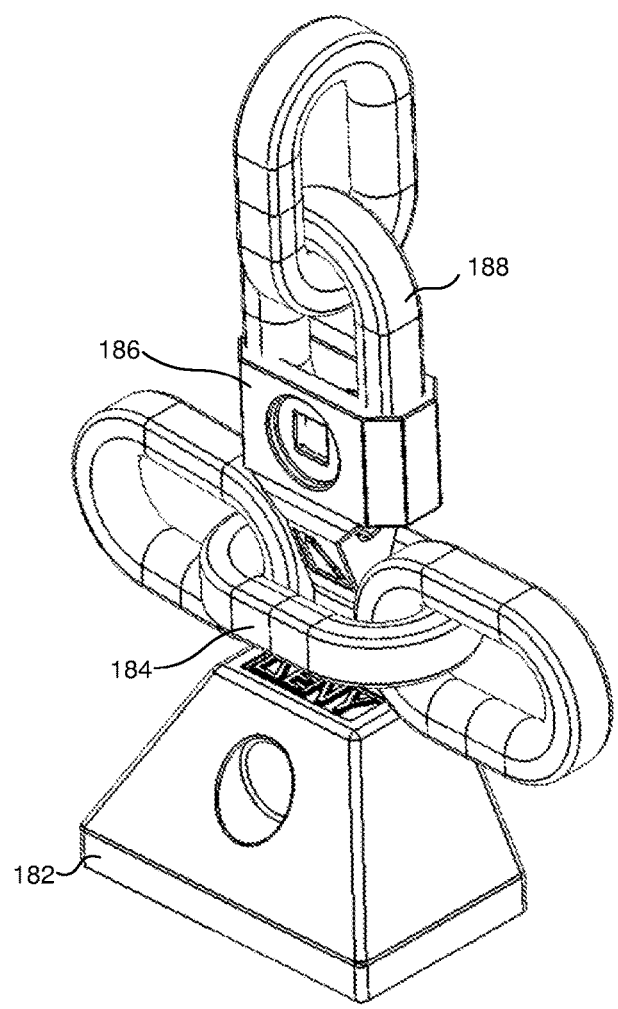

The capture-member adapter 186 depicted FIGS. 18A-18B is similar to the adapter 156 depicted in FIGS. 15A-15C. The capture-member adapter 186 includes a cavity portion 186a configured to receive chain link 188 (or similar link or loop). The capture-member adapter 186 includes a first hole 186b through which a pin (not shown) can be placed to secure the link 188 within the cavity portion 186a. The second portion of the capture-member adapter 186c is configured as a pin to fit in the box of a surface-mountable locking device 182 and includes a second hole 186d configured to engage a locking-mechanism bolt in the box of the locking device 182.

Figure 19A:
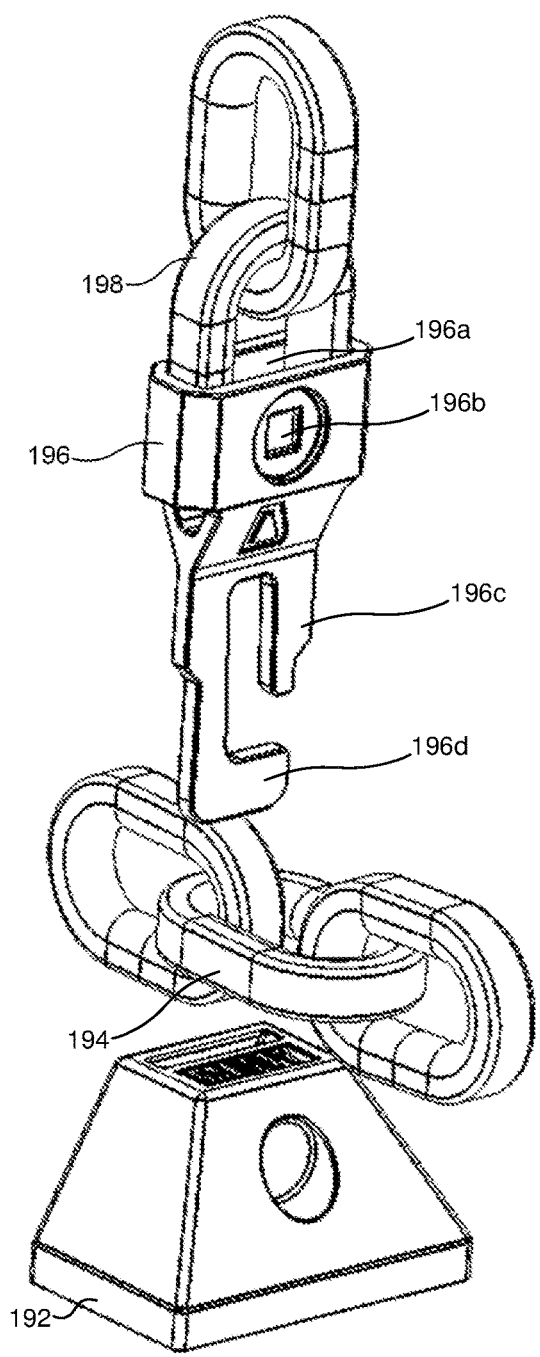
FIGS. 19A-19B are views of an exemplary capture-member adapter (locking-pin adapter) that can be used to secure a chain link (or similar link or loop) to a surface-mountable locking device.
Figure 19B:
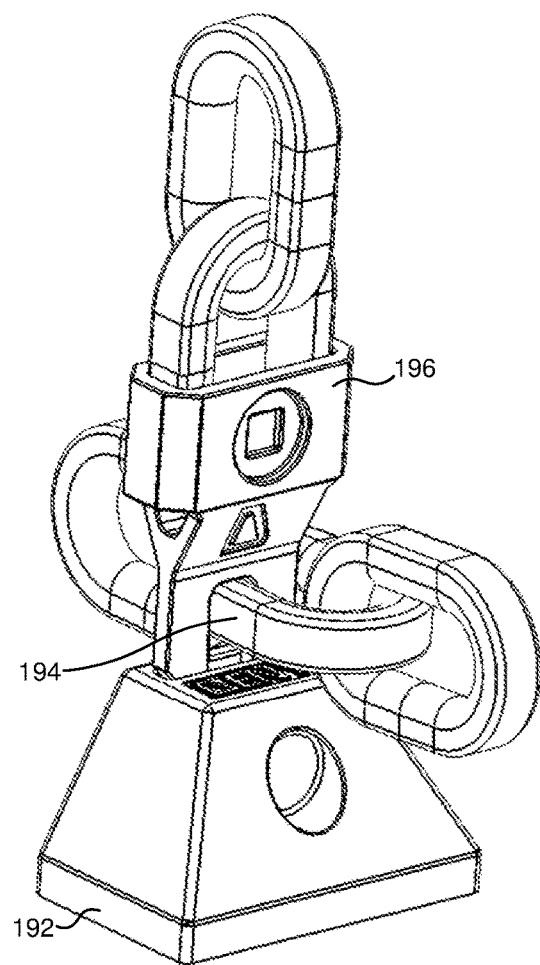

The capture-member adapter 196 depicted FIGS. 19A-19B combines the link-securing cavity 186a of the capture-member adapter 186 depicted in FIGS. 18A-18B and a variant of the link-capture hook of the adapter 166 depicted in FIGS. 16A-16B. The capture-member adapter 196 includes a cavity portion 196a configured to receive chain link 198 and a first hole 196b configured to receive a pin to secure the link 198 in the cavity 196a. The adapter 196 further includes a first hook portion 196c and a second hook portion 196d that together form a hook configured to engage a chain link 194. The second portion 196d is configured as a pin to fit in the box of a surface-mountable locking device 192. In use, the top hook portion 196c fits within the box of the locking device 192 and the open side of the hook defined by the top hook portion 196c and the bottom hook portion 196d is within the box and is thereby protected by the locking device 192.

Figure 20:
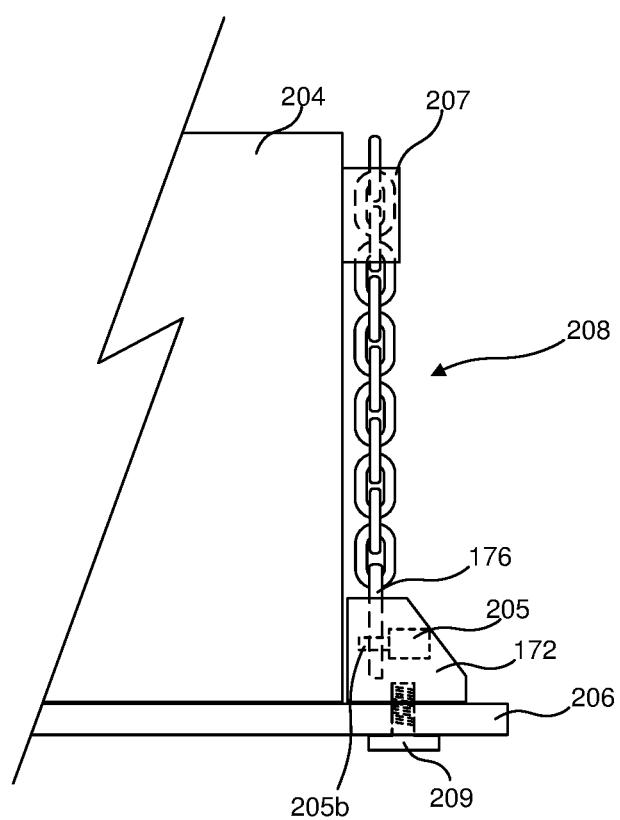
FIG. 20 illustrates a container secured to a surface with a chain that is secured to a surface-mounted locking device through an exemplary capture-member adapter.
Figure 21A:
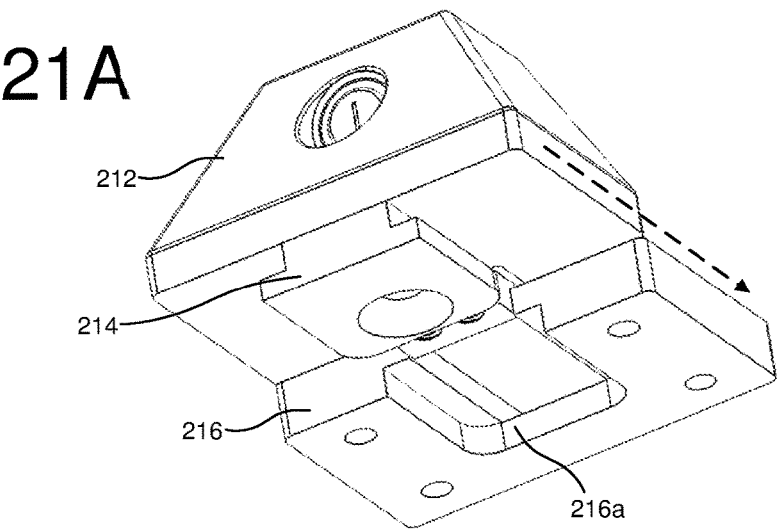
FIGS. 21A-21O are views of an exemplary bracket for mounting a locking device to a surface.
Figure 21B:
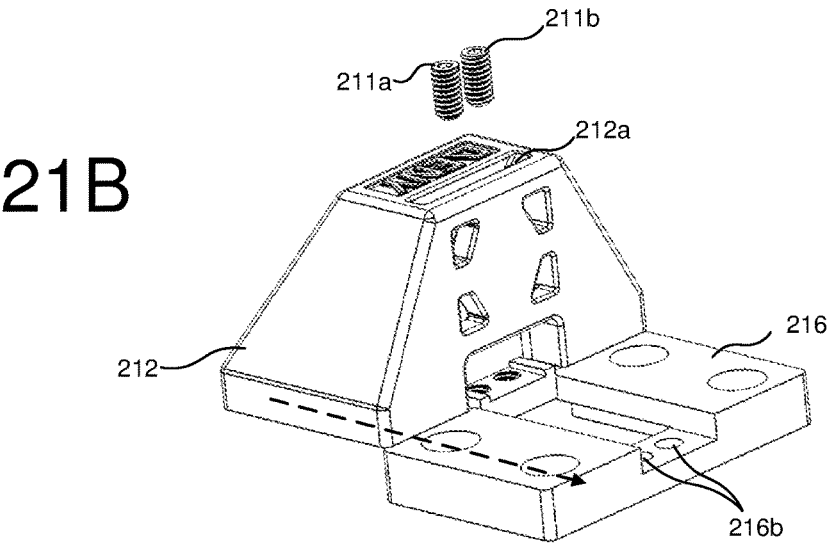
Figure 21C:
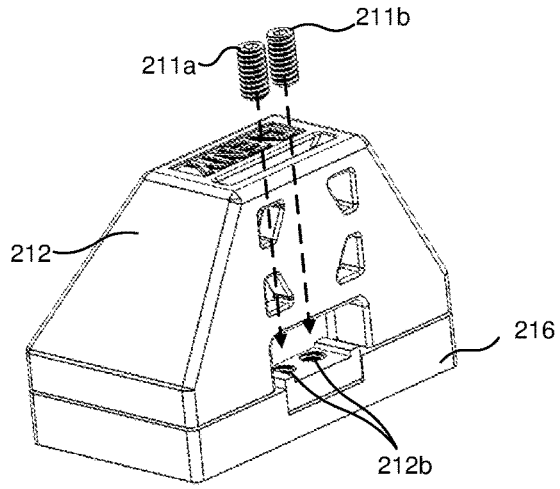
Figure 21D:
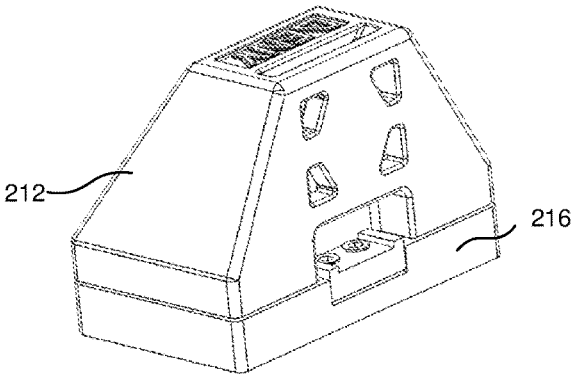

A capture-member adapter may be used, for example, to secure an item to a surface using chains and a surface-mountable locking device. One such use is illustrated in FIG. 20. A chain 208 is looped through a feature 207 on a container 204. The chain is attached to a locking device 172 using a capture-member adapter 176. The locking device 172 is mounted to a surface 206 with a threaded bolt 209. A locking mechanism 205 is actuated so that the locking-mechanism bolt 205b engages the capture-member adapter 176, and thereby secures the capture member 176 in the locking device 172 and the container 204 to the surface 206. The locking-mechanism bolt 205b is protected from cutting tools by the locking device 172. Thus, the locking device 172 can be used with chains (or any fastening strap connectable to a capture-member adapter through a closed loop or link) to provide a more secure attachment than, say, a padlock connecting to a standard anchor.

Exemplary locking-device surface-mounting brackets are illustrated in FIGS. 21A-21D and 22A-22D. The surface-mounting brackets allow for secure mounting of a locking device to a surface while easing the task of removing the locking device from the surface.

In FIGS. 21A-21D, a mounting bracket 216 includes a recess 216a that when mounted to a surface forms a T-slot (or the bracket itself may include a fully formed T-slot). A T-nut 214 is attached to the bottom of a locking device 212. (Equivalently, the T-nut may be integrally formed in the locking device.) The T-nut 214 is configured to engage the recess 216a by sliding into or out of the recess 216a (in FIGS. 21A and 21B, a dashed arrow indicates the motion of a locking device 212 sliding to engage the bracket 216.) When the T-nut 214 engages the recess 216a of a surface-mounted bracket 216, the locking device 212 will be captured and will not be able to move relative to the bracket 216 except to slide into or out of the bracket 216. The bracket 216 includes two threaded holes 216b configured to accept two threaded bolts 211a, 211b. The locking device 212 includes two threaded holes 212b configured to accept the two threaded bolts 211a, 211b. To mount the locking device 212 to a surface using the bracket 216, the bracket 216 is installed on the surface (e.g., with threaded bolts, concrete anchor bolts, or rivets through the four holes depicted in the bracket 216), the locking device 212 is positioned so the T-nut 214 engages the bracket's recess 216a, and the threaded bolts 211a, 211b are fed through the locking-device box 212a, threaded through the locking-device holes 212a and into the bracket holes 216b. When installed, the threaded bolts 211a, 211b prevent the locking device 212 from sliding out of the bracket 216. When a capture member (or capture-member adapter) is placed in the locking-device box 212a to secure an item to a surface, the bolts 211a, 211b are protected from tampering with a removal or cutting tool.

The mounting bracket illustrated in FIGS. 22A-22D is similar to that illustrated in FIGS. 21A-21D. The brackets differ with respect to how the locking device is secured in the bracket. A mounting bracket 226 includes a recess 226a that when mounted to a surface forms a T-slot (or the bracket itself may include a fully formed T-slot). A T-nut 224 is attached to the bottom of a locking device 222. (Equivalently, the T-nut may be integrally formed in the locking device.) The T-nut 224 is configured to engage the recess 226a by sliding into or out of the recess 226a (in FIGS. 22A and 22B, a dashed arrow indicates the motion of a locking device 222 sliding to engage the bracket 226.) When the T-nut 224 engages the recess 226a of a surface-mounted bracket 226, the locking device 222 will be captured and will not be able to move relative to the bracket 226 except to slide into or out of the bracket 226. The bracket 226 includes a slot 226b configured to receive a capture member 221 (or a capture-member adapter). To mount the locking device 222 to a surface using the bracket 226, the bracket 226 is installed on the surface, and the locking device 222 is positioned so the T-nut 224 engages the bracket's recess 226a. When the capture member 221 (or a capture-member adapter) is placed in the locking-device box 222a to secure an item to a surface, the capture member 221 also engages the bracket's slot 226b thereby preventing the locking device 222 from sliding out of the bracket 226.

The embodiments illustrated in FIGS. 21A-210 and 22A-22D depict a T-slot in the mounting bracket and a T-nut on the locking device but an equivalent variation would be to have the T-slot on the locking device and the T-nut on the mounting bracket.

Figure 23A:
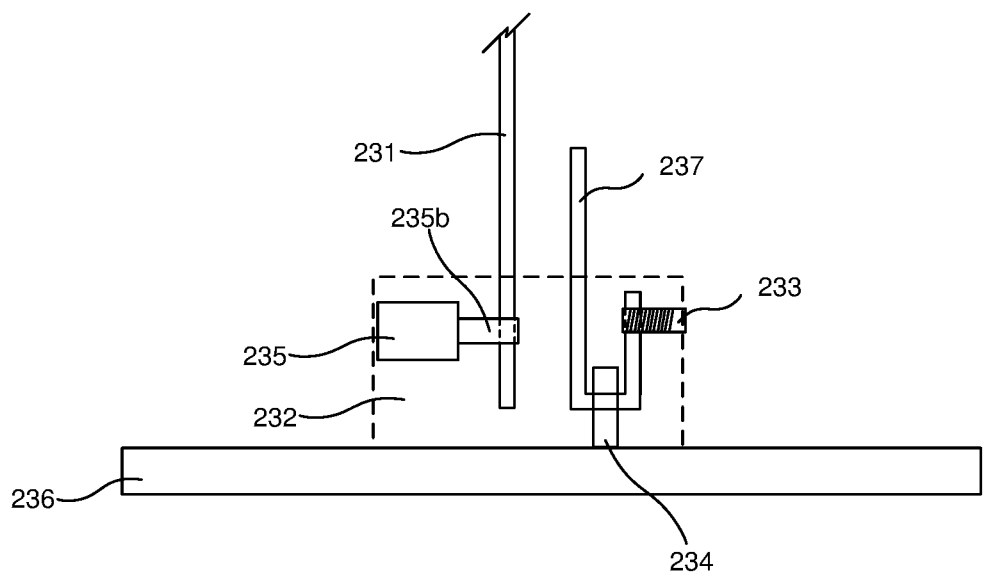
FIGS. 23A-23B illustrate exemplary locking devices configured for mounting to a surface by engaging an anchor on the surface.
Figure 23B:
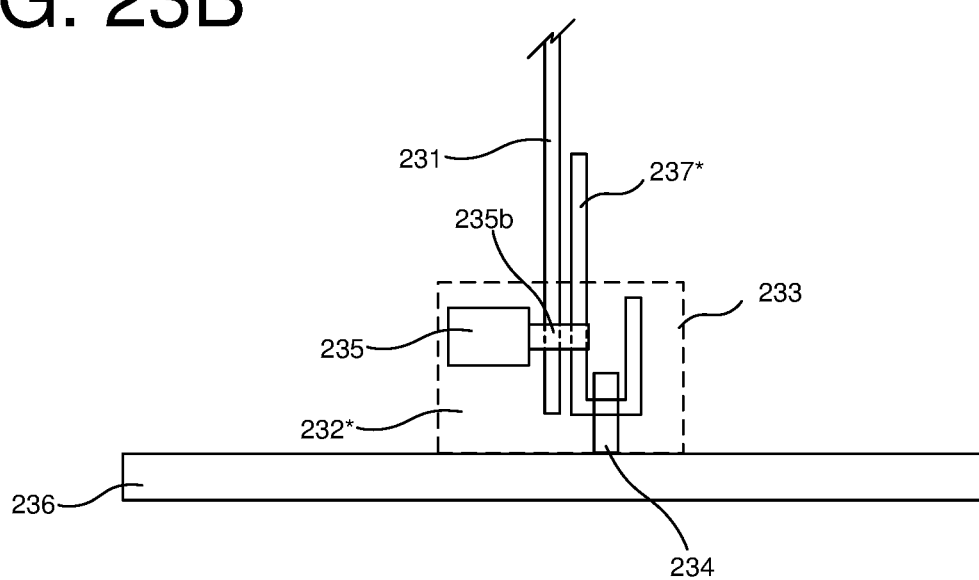

Exemplary surface-mountable locking devices configured to mount to a surface via standard anchors already on the surface are illustrated in FIGS. 23A-23B. A locking device 232 is configured with a cavity to fit over an anchor 234 installed on a surface 236 (e.g rings or cleats installed on the bed or in the stake holes of a pickup truck). An anchor-capture member 237 engages the anchor 234 (e.g., by hooking through the anchor loop) and is secured to the locking device 232 (e.g., by a bolt), thereby holding the locking device 232 in place over the anchor 234. This serves two purposes. First, it secures the locking device 232 to the surface 236. Second, it protects the anchor 234 from cutting or prying tools. (The dashed lines in these figures indicate an item that, for purposes of the illustration, is transparent so that items within may be viewed.)

In the embodiment illustrated in FIG. 23A, the anchor-capture member 237 is secured to the locking device 232 with a threaded bolt 233 independent of any capture member 231 (or capture-member adapter) secured in the box of the locking device 232 with the locking-mechanism bolt 235b. The threaded bolt 233 is placed through a hole in the locking device 232 and threaded into a hole in the anchor-capture member 237. The bolt may be keyed for added security. The anchor 234, threaded bolt 233, and locking mechanism 235 are protected by the body of the locking device 232.

In the embodiment illustrated in FIG. 23B, the anchor-capture member 237* is secured to the locking device 232* with the locking mechanism 235. The capture member 231 and the anchor-capture member 237* are secured in place in the locking device 232* with the locking-mechanism bolt 235b. Thus, the locking device 232* is secured to the surface 236 when the locking mechanism 235 is engaged and is free to move from the surface when the locking mechanism 235 is disengaged. The anchor 234 and locking mechanism 235 are protected by the body of the locking device 232*.

Exemplary benefits of a surface-mountable locking device can be understood with respect to FIG. 1B. Using the device, a container 114, such as a cooler, can be mounted to a surface 16 such as the bed of a pick-up truck or a driveway. The locking device 12 is mounted to a surface such that the body of the device covers the mounting fastener and thereby protects the fastener from tampering. (Equivalently, the locking device may be formed as integral portion of the surface.) The locking device 12 includes a box (cavity) configured to accept a pin of a capture member 110 or of a capture-member adapter attached to a link or loop (that in turn is attached to a chain, strap, rope, or the like). A locking-mechanism bolt disposed within the body of the locking device 12 is configured to engage the pin of the capture member (or capture-member adapter) within the box of the device 12. Because the locking-mechanism bolt engages the pin within the box of the device, the body of the device 12 protects the bolt from tampering. The capture member 110 (or chain or strap or rope or the like) is attached to an item on the surface 16 (such as a container 114 or a spare tire) and also to the locking device 12. Because the body of the locking device 12 protects the points of attachment between the surface 16 and the device 12 and between the device 12 and the capture member 110, the surface-mountable locking device 12 provides a more secure lock than, for example, a padlock with an exposed locking bolt.

While the foregoing description is directed to the preferred embodiments of the invention, other and further embodiments of the invention will be apparent to those skilled in the art and may be made without departing from the basic scope of the invention. And features described with reference to one embodiment may be combined with other embodiments, even if not explicitly stated above, without departing from the scope of the invention. The scope of the invention is defined by the claims which follow.

The invention claimed is:

1. A surface-mountable locking device comprising:
   (a) a body comprising:
      (i) a box shaped to receive a pin; and
      (ii) a mounting means for mounting the body to a surface;
   (b) a locking mechanism comprising a bolt and an actuator;
   (c) wherein the locking mechanism is disposed within the body; and
   (d) wherein the locking-mechanism bolt is configured to engage the pin within the box of the body whereby the body encompasses the locking-mechanism bolt when the locking-mechanism bolt is engaged with the pin.

2. The surface-mountable locking device of claim 1 wherein the mounting means includes at least one fastener selected from the group consisting of a T-nut, a threaded bolt, a T-slot, and a threaded hole.

3. The surface-mountable locking device of claim 1 wherein the body includes a cavity configured to receive an anchor installed on a surface, whereby the body encompasses the anchor when the anchor is received in the cavity.

4. The surface-mountable locking device of claim 3 wherein the mounting means includes a hook shaped to engage the anchor within the cavity, whereby the body encompasses the hook when the hook is engaged with the anchor within the cavity.

5. The surface-mountable locking device of claim 4 wherein the hook includes one of the group consisting of a first receptacle shaped to receive the locking-mechanism bolt and a second receptacle shaped to receive a retaining bolt.

6. The surface-mountable locking device of claim 5 wherein the second receptacle and the retaining bolt are each threaded such that the retaining bolt may threadedly engage the second receptacle.

7. A device for securing an item to a surface, the device comprising:
   (a) a surface-mountable locking device comprising:
      (i) at least one of the group consisting of a box shaped to receive a pin and a pin shaped to be received by a box,
      (ii) a fastening means for fastening the surface-mountable locking device to a surface; and
   (b) a capture member comprising:
      (i) a first securing means for engaging at least one of the locking mechanism's at least one of the group consisting of a box shaped to receive a pin and a pin shaped to be received by a box, and
      (ii) a second securing means for engaging an item to be secured;
   (c) a locking mechanism comprising a bolt and an actuator.

8. The device of claim 7 wherein the locking mechanism includes at least one of the group consisting of a push locking mechanism and a rotating locking mechanism.

9. The device of claim 7 wherein the fastening means includes at least one of the group consisting of T-nut, a threaded bolt, a T-slot, and a threaded hole.

10. The device of claim 7 wherein the second securing means includes at least one of the group consisting of an arm shaped to abut an external surface of the item to be secured, a hook shaped to engage an aperture in the item to be secured, a hook shaped to engage a handle on the item to be secured, an aperture shaped to engage a hook on the item to be secured, and an aperture shaped to engage a hook in the item to be secured.

11. The device of claim 7 wherein the capture member includes a series of two or more plates connected together by one or more hinges.

12. The device of claim 7 wherein the second securing means includes a chain link.

13. The device of claim 7 wherein the first securing means includes a locking-pin adapter comprising an end configured to engage at least one of the group consisting of a link and a loop.

* * * * *